(12) United States Patent
Sato et al.

(10) Patent No.: US 11,371,904 B2
(45) Date of Patent: Jun. 28, 2022

(54) SENSOR MODULE AND SENSOR SYSTEM WITH IMPROVED ABNORMALITY DETECTION AND ABNORMALITY DETERMINATION METHOD FOR AN INERTIAL SENSOR

(71) Applicant: SEIKO EPSON CORPORATION, Tokyo (JP)

(72) Inventors: Kenta Sato, Shiojiri (JP); Yasushi Yoshikawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 16/796,503

(22) Filed: Feb. 20, 2020

(65) Prior Publication Data
US 2020/0271535 A1     Aug. 27, 2020

(30) Foreign Application Priority Data

Feb. 22, 2019 (JP) .............................. JP2019-030454

(51) Int. Cl.
    *G01L 9/00*     (2006.01)
    *G01L 27/00*     (2006.01)
    *G01L 9/12*     (2006.01)

(52) U.S. Cl.
    CPC .......... *G01L 27/007* (2013.01); *G01L 9/0073* (2013.01); *G01L 9/12* (2013.01)

(58) Field of Classification Search
None
See application file for complete search history.

(56) References Cited

U.S. PATENT DOCUMENTS

| | | | | |
|---|---|---|---|---|
| 5,467,729 | A * | 11/1995 | Yamada | F16L 1/11 116/209 |
| 5,506,454 | A | 4/1996 | Hanzawa et al. | |
| 6,450,029 | B1 * | 9/2002 | Sakai | G01P 15/125 324/661 |
| 7,325,457 | B2 * | 2/2008 | Fujimori | B60C 23/0408 361/283.1 |
| 8,875,577 | B2 * | 11/2014 | Uemura | G01C 19/5614 73/514.01 |
| 2011/0100126 | A1 * | 5/2011 | Jeong | G01P 15/125 73/514.32 |
| 2011/0285444 | A1 | 11/2011 | Uemura et al. | |
| 2018/0267078 | A1 * | 9/2018 | Sato | G01P 15/097 |

FOREIGN PATENT DOCUMENTS

| | | |
|---|---|---|
| CN | 102292616 | 12/2011 |
| CN | 108627675 | 10/2018 |
| JP | H05-322921 | 12/1993 |
| JP | H06-148234 | 5/1994 |
| JP | H07-140242 | 6/1995 |
| JP | 2001-091535 | 4/2001 |
| JP | 2007-086002 | 4/2007 |
| WO | 2017/010309 | 1/2017 |
| WO | 2017/072897 | 5/2017 |

* cited by examiner

*Primary Examiner* — Lisa M Caputo
*Assistant Examiner* — Nigel H Plumb
(74) *Attorney, Agent, or Firm* — Workman Nydegger

(57) ABSTRACT

A sensor module that includes an inertial sensor and an abnormality determination unit that determines that the inertial sensor is abnormal when a structural resonance frequency at the first time point and a structural resonance frequency at the second time point are separated by a predetermined value or more.

7 Claims, 12 Drawing Sheets

SENSOR MODULE AND SENSOR SYSTEM WITH IMPROVED ABNORMALITY DETECTION AND ABNORMALITY DETERMINATION METHOD FOR AN INERTIAL SENSOR

The present application is based on, and claims priority from JP Application Serial Number 2019-030454, filed Feb. 22, 2019, the disclosure of which is hereby incorporated by reference herein in its entirety.

BACKGROUND

1. Technical Field

The present disclosure relates to a sensor module, a sensor system, and an abnormality determination method of an inertial sensor.

2. Related Art

Various systems in which data detected by a plurality of sensor modules installed in a structure are processed by a processing device to provide desired information are widespread. In recent years, with the increasing importance of infrastructure maintenance, since it is difficult for an operator to diagnose whether a sensor module is normal or abnormal on site, the importance of a sensor module having a self-diagnosis function is increasing.

For example, in JP-A-2007-086002, there has been proposed a sensor that has a capacitor whose capacitance changes in accordance with a change in physical quantity, and performs self-diagnosis by measuring the capacitance of the capacitor with a control signal having a frequency near a resonance frequency of the capacitor.

However, in the sensor described in JP-A-2007-086002, there is a problem that a circuit increases because it is necessary to generate a control signal for diagnosis and control a voltage application timing to a fixed electrode of the capacitor by the control signal.

SUMMARY

An aspect of a sensor module according to the present disclosure includes an inertial sensor, a storage unit that stores a structural resonance frequency in a detection axis direction of the inertial sensor at a first time point, a resonance frequency measurement unit that measures the structural resonance frequency in the detection axis direction of the inertial sensor at a second time point based on an output signal of the inertial sensor, and an abnormality determination unit that determines that the inertial sensor is abnormal when the structural resonance frequency at the first time point and the structural resonance frequency at the second time point are separated by a predetermined value or more.

In the aspect of the sensor module, the resonance frequency measurement unit may measure an intensity of the output signal of the inertial sensor per frequency, and may set a first frequency having a maximum intensity as the structural resonance frequency at the second time point.

In the aspect of the sensor module, the abnormality determination unit may determine that the inertial sensor is abnormal when a ratio between the first frequency and a second frequency having a minimum intensity is smaller than a predetermined value.

In the aspect of the sensor module, the inertial sensor may include a movable portion, a stationary portion, a joint portion coupling the movable portion and the stationary portion, and a physical quantity detection element bonded to the stationary portion and the movable portion may be is a crystal.

The aspect of the sensor module may further include a sensitivity adjustment unit that adjusts a detection sensitivity of a physical quantity according to the structural resonance frequency at the second time point.

An aspect of a sensor system according to the present disclosure includes the aspect of the sensor module and a processing device that performs processing based on an output signal of the sensor module.

An aspect of an abnormality determination method of an inertial sensor according to the present disclosure includes a resonance frequency acquisition step of acquiring a structural resonance frequency in a detection axis direction of the inertial sensor at a first time point stored in a storage unit, a resonance frequency measurement step of measuring the structural resonance frequency in the detection axis direction of the inertial sensor at a second time point based on an output signal of the inertial sensor, and an abnormality determination step of determining that the inertial sensor is abnormal when the structural resonance frequency at the first time point and the structural resonance frequency at the second time point are separated by a predetermined value or more.

DESCRIPTION OF EXEMPLARY EMBODIMENTS

Hereinafter, exemplary embodiments of the present disclosure will be described in detail with reference to the drawings. The embodiments described below do not unduly limit the contents of the present disclosure described in the aspects. In addition, not all of the configurations described below are essential constituent requirements of the present disclosure.

1. First Embodiment 1-1. Sensor Module Structure

First, an example of a sensor module structure used in a sensor system of the present embodiment will be described.

Figure 1:
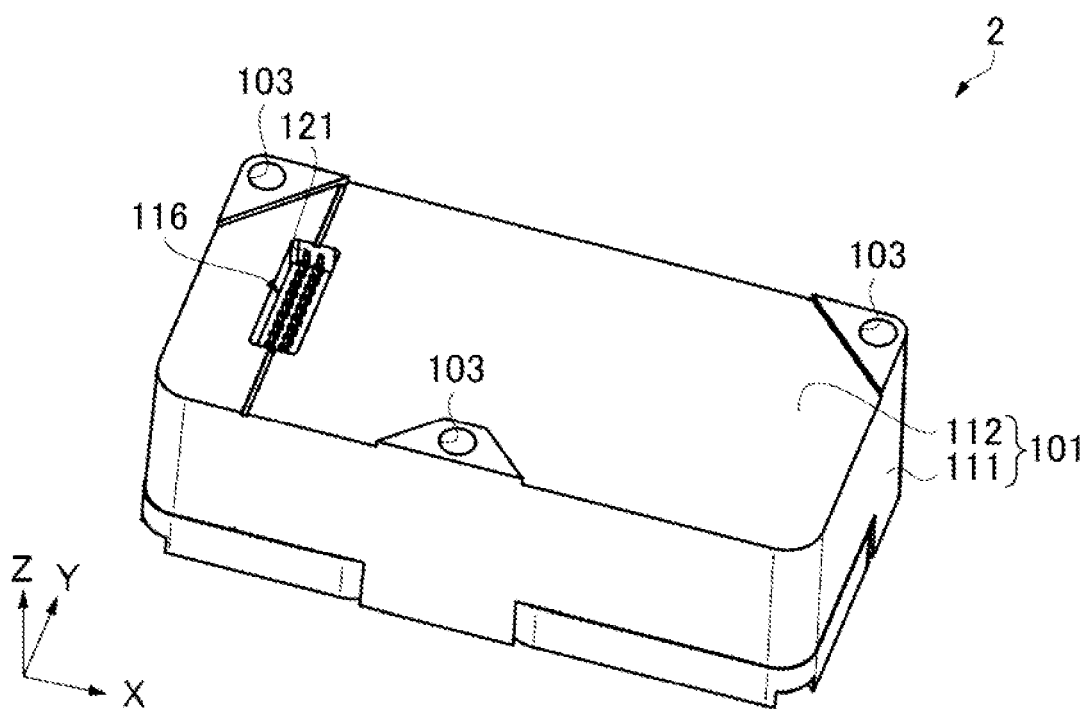
FIG. 1 is a perspective view of a sensor module.

FIG. 1 is a perspective view of a sensor module 2 when viewed from a mounted surface side to which the sensor module 2 is fixed. In the following description, a direction along a long side of the sensor module 2 that forms a rectangle in a plan view will be described as an X axis direction, a direction orthogonal to the X axis direction in a plan view will be described as a Y axis direction, and a thickness direction of the sensor module 2 will be described as a Z axis direction.

The sensor module 2 is a rectangular parallelepiped having a rectangular planar shape, and has a long side along the X axis direction and a short side along the Y axis direction orthogonal to the X axis direction. Screw holes 103 are formed at two locations near the end portions of one long side and at one location in the center of the other long side. Each of the three screw holes 103 is used in a state of being fixed to a mounted surface of a mounted body of a structure such as a building or a bulletin board through a fixing screw.

As illustrated in FIG. 1, an opening portion 121 is provided on the surface of the sensor module 2 viewed from the mounted surface side. A plug-type connector 116 is disposed inside the opening portion 121. The connector 116 has a plurality of pins arranged in two rows, and in each row, the plurality of pins are arranged in the Y axis direction. A socket-type connector (not illustrated) is coupled to the connector 116 from the mounted body, and an electric signal such as a driving voltage of the sensor module 2 and detection data is transmitted and received.

Figure 2:
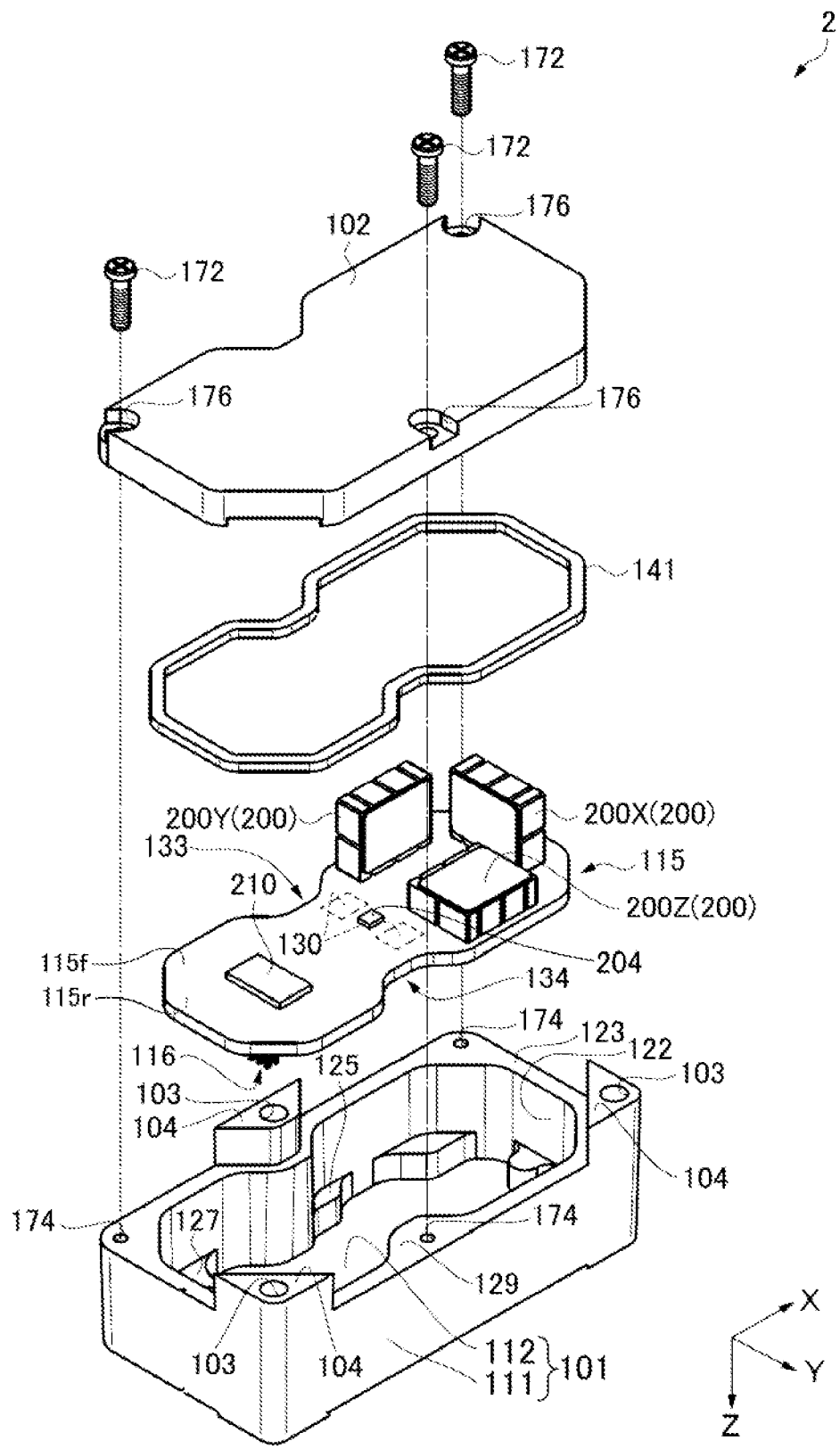
FIG. 2 is an exploded perspective view of the sensor module.

FIG. 2 is an exploded perspective view of the sensor module 2. As illustrated in FIG. 2, the sensor module 2 includes a container 101, a lid 102, a sealing member 141, a circuit substrate 115, and the like. More specifically, in the sensor module 2, the circuit substrate 115 is attached to the inside of the container 101 with a fixed member 130 interposed, and the opening of the container 101 is covered with the lid 102 through the sealing member 141 having buffering properties.

The container 101 is an accommodation container for the circuit substrate 115 made of, for example, aluminum and formed into a box shape having an internal space. Similar to the overall shape of the sensor module 2 described above, an outer shape of the container 101 is a rectangular parallelepiped having a substantially rectangular plane shape, and is provided with fixed protrusions 104 at two locations near both end portions of one long side and at one location in the center of the other long side. A screw hole 103 is formed in each of the fixed protrusions 104.

The container 101 is a box shape whose outer shape is a rectangular parallelepiped and opened to one side. The inside of the container 101 is an internal space surrounded by a bottom wall 112 and a side wall 111. In other words, the container 101 has a box shape in which one surface facing the bottom wall 112 is an opening surface 123, is disposed so that the outer edge of the circuit substrate 115 is along an inner surface 122 of the side wall 111, and the lid 102 is fixed so as to cover the opening. On the opening surface 123, fixed protrusions 104 are erected at two locations near both ends of one long side of the container 101 and at one location in the center of the other long side. The upper surface of the fixed protrusion 104, that is, the surface exposed in the -Z direction protrudes from the upper surface of the container 101.

In addition, in the internal space of the container 101, a protrusion 129 that protrudes from the side wall 111 to the internal space side from the bottom wall 112 to the opening surface 123 is provided at the center of one long side that faces the fixed protrusion 104 provided at the center of the other long side. A female screw 174 is provided on the upper surface of the protrusion 129. The lid 102 is fixed to the container 101 through the sealing member 141 with a screw 172 and the female screw 174 inserted through a through-hole 176. The protrusion 129 and the fixed protrusion 104 are provided at positions facing constricted portions 133 and 134 of the circuit substrate 115 described later.

In the internal space of the container 101, a first pedestal 127 and a second pedestal 125 are provided that protrude from the bottom wall 112 toward the opening surface 123 in the form of a step higher than the bottom wall 112. The first pedestal 127 is provided at a position facing the arrangement region of the plug-type connector 116 attached to the circuit substrate 115. The first pedestal 127 is provided with an opening portion 121 illustrated in FIG. 1, and a plug-type connector 116 is inserted into the opening portion 121. The first pedestal 127 functions as a pedestal for fixing the circuit substrate 115 to the container 101.

The second pedestal 125 is located on the side opposite to the first pedestal 127 with respect to the fixed protrusion 104 and the protrusion 129 located at the center of the long side, and is provided in the vicinity of the fixed protrusion 104 and the protrusion 129. The second pedestal 125 functions as a pedestal for fixing the circuit substrate 115 to the container 101 on the side opposite to the first pedestal 127 with respect to the fixed protrusion 104 and the protrusion 129.

Although the outer shape of the container 101 is described as a rectangular shape having a substantially rectangular parallelepiped shape and a box shape without a lid, the shape is not limited thereto. The planar shape of the outer shape of the container 101 may be a square, a hexagon, an octagon, or the like. In addition, in the planar shape of the outer shape of the container 101, the corners of the polygonal apex portion may be chamfered, and furthermore, anyone of the sides may be a planar shape made of a curve. In addition, the planar shape inside the container 101 is not limited to the shape described above, and may be another shape. Furthermore, the planar shape of the outer shape and the inside of the container 101 may be similar or may not be similar to each other.

The circuit substrate 115 is a multilayer substrate in which a plurality of through-holes and the like are formed. For example, a glass epoxy substrate, a composite substrate, a ceramic substrate, or the like is used.

The circuit substrate 115 has a second surface 115$r$ on the bottom wall 112 side, and a first surface 115$f$ that has a front-rear relationship with the second surface 115$r$. On the first surface 115f of the circuit substrate 115, a microcontroller 210, a temperature sensor 204, three inertial sensors 200, and other electronic components (not illustrated) are mounted. In addition, the connector 116 is mounted on the second surface 115r of the circuit substrate 115. Although illustration and description thereof are omitted, the circuit substrate 115 may be provided with other wirings, terminal electrodes, and the like.

The circuit substrate 115 includes constricted portions 133 and 134 in which the outer edge of the circuit substrate 115 is constricted at the center in the X axis direction along the long side of the container 101 in a plan view. The constricted portions 133 and 134 are provided on both sides in the Y axis direction of the circuit substrate 115 in a plan view, and are constricted from the outer edge of the circuit substrate 115 toward the center. In addition, the constricted portions 133 and 134 are provided to face the protrusion 129 and the fixed protrusion 104 of the container 101.

The circuit substrate 115 is inserted into the internal space of the container 101 with the second surface 115r facing the first pedestal 127 and the second pedestal 125. The circuit substrate 115 is supported by the container 101 by the first pedestal 127 and the second pedestal 125.

The inertial sensor 200 is a sensor that detects a physical quantity using inertia. Of the three inertial sensors 200, an inertial sensor 200X detects a physical quantity in the X axis direction, an inertial sensor 200Y detects a physical quantity in the Y axis direction, and an inertial sensor 200Z detects a physical quantity in the Z axis direction. Specifically, the inertial sensor 200X is erected so that the front and rear surfaces of the package face in the X axis direction and the side surface faces the first surface 115f of the circuit substrate 115. The inertial sensor 200X outputs a signal corresponding to the detected physical quantity in the X axis direction. The inertial sensor 200Y is erected so that the front and rear surfaces of the package face in the Y axis direction and the side surface faces the first surface 115f of the circuit substrate 115. The inertial sensor 200Y outputs a signal corresponding to the detected physical quantity in the Y axis direction. The inertial sensor 200Z is provided so that the front and rear surfaces of the package face in the Z axis direction, that is, the front and rear surfaces of the package face the first surface 115f of the circuit substrate 115. The inertial sensor 200Z outputs a signal corresponding to the detected physical quantity in the Z axis direction.

The microcontroller 210 is electrically coupled to the temperature sensor 204 and the inertial sensors 200X, 200Y, and 200Z through wiring and electronic parts (not illustrated). In addition, the microcontroller 210 controls each part of the sensor module 2 and generates physical quantity data based on output signals of the inertial sensors 200X, 200Y, and 200Z.

1-2. Structure of Inertia Sensor

Next, an example of the structure of the inertial sensor 200 will be described using a case where the inertial sensor 200 is an acceleration sensor as an example. The three inertial sensors 200 illustrated in FIG. 2, that is, the inertial sensors 200X, 200Y, and 200Z, may have the same structure.

Figure 3:
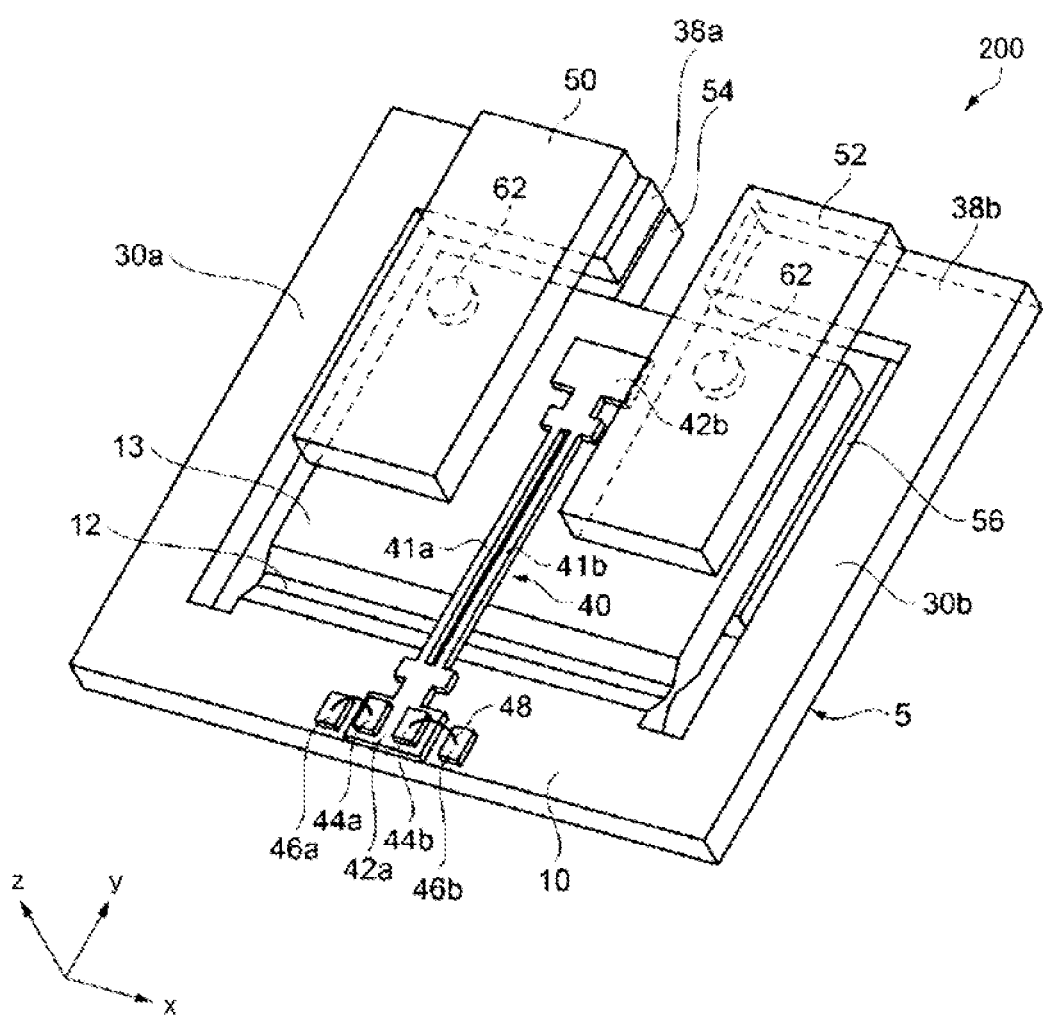
FIG. 3 is a perspective view of an inertial sensor.
Figure 4:
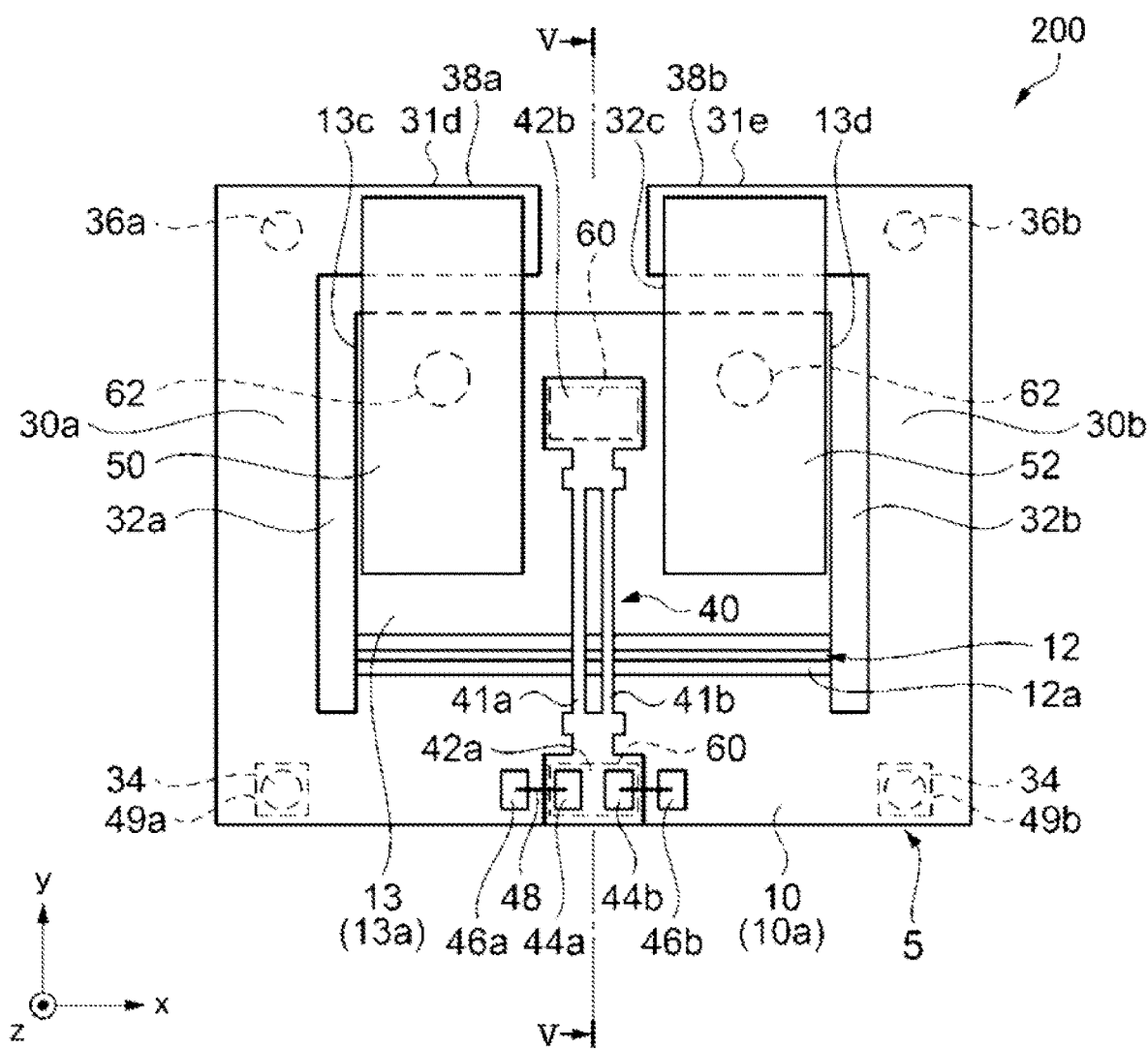
FIG. 4 is a plan view of the inertial sensor.
Figure 5:
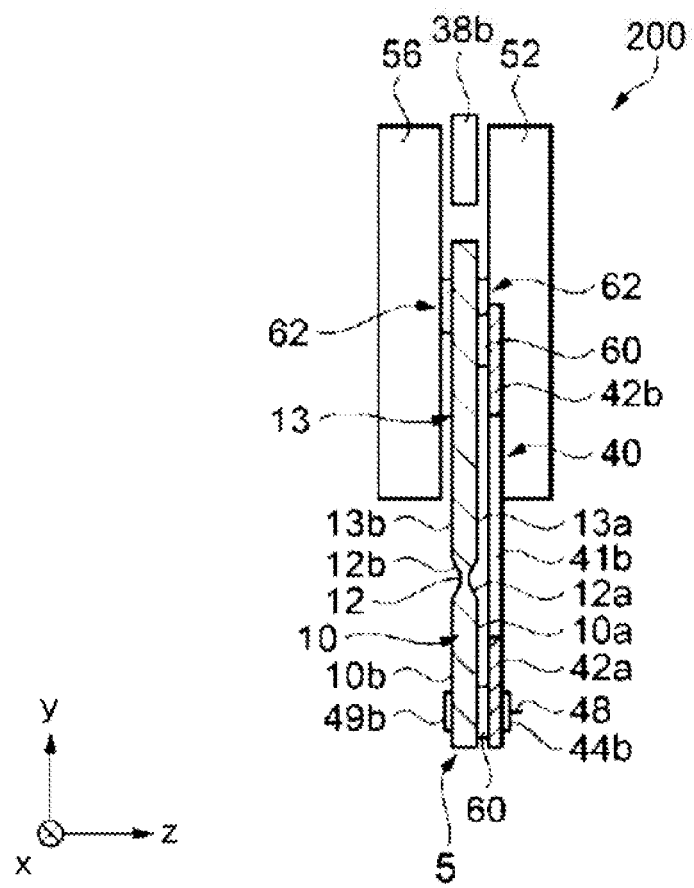
FIG. 5 is a cross-sectional view taken along the line V-V in FIG. 4.

FIG. 3 is a perspective view of the inertial sensor 200, FIG. 4 is a plan view of the inertial sensor 200, and FIG. 5 is a cross-sectional view taken along the line V-V of FIG. 4. FIGS. 3 to 5 illustrate only the interior of the inertial sensor 200 package. In the subsequent drawings, for convenience of description, the x axis, the y axis, and the z axis are illustrated as three axes orthogonal to each other. In addition, in the following description, for convenience of description, the plan view when viewed from the z axis direction that is the thickness direction of extension portions 38a and 38b is simply referred to as "plan view".

As illustrated in FIGS. 3 to 5, the inertial sensor 200 includes a substrate unit 5 and four weights 50, 52, 54, and 56.

The substrate unit 5 includes a plate-like base part 10 having main surfaces 10a and 10b extending in the x axis direction and facing opposite to each other, a joint portion 12 extending from the base part 10 in the y axis direction, a movable portion 13 extending in a rectangular shape from the joint portion 12 in a direction opposite to the base part 10, two support portions 30a and 30b extending along the outer edge of the movable portion 13 from both ends of the base part 10 in the x axis direction, and a physical quantity detection element 40 that is spanned from the base part 10 to the movable portion 13 and bonded to the base part 10 and the movable portion 13.

In the two support portions 30a and 30b, the support portion 30a extends along the y axis to face the movable portion 13 with a gap 32a therebetween, and is provided with a bonding portion 36a for fixing support portion 30a and the extension portion 38a extending along the x axis to face the movable portion 13 with a gap 32c therebetween. In other words, the support portion 30a extends along the y axis to face the movable portion 13 with the gap 32a therebetween, and is provided with the extension portion 38a extending along the x axis to face the movable portion 13 with the gap 32c therebetween, and the bonding portion 36a at a portion in the extension portion 38a. In addition, the support portion 30b extends along the y axis to face the movable portion 13 with a gap 32b therebetween, and is provided with a bonding portion 36b for fixing the support portion 30b and the extension portion 38b extending along the x axis to face the movable portion 13 with the gap 32c therebetween. In other words, the support portion 30b extends along the y axis to face the movable portion 13 with the gap 32b therebetween, and is provided with the extension portion 38b extending along the x axis to face the movable portion 13 with the gap 32c therebetween, and the bonding portion 36b at a portion in the extension portion 38b.

The bonding portions 36a and 36b provided in the support portions 30a and 30b are for mounting the substrate unit 5 of the inertial sensor 200 on an external member such as a package. In addition, the base part 10, the joint portion 12, the movable portion 13, the support portions 30a and 30b, and the extension portions 38a and 38b may be formed integrally.

The movable portion 13 is surrounded by the support portions 30a and 30b and the base part 10, is coupled to the base part 10 through the joint portion 12, and is cantilevered. The movable portion 13 includes the main surfaces 13a and 13b facing opposite to each other, and a side surface 13c along the support portion 30a and a side surface 13d along the support portion 30b which are side surfaces forming the main surfaces 13a and 13b in a plan view. The main surface 13a is a surface facing the same side as the main surface 10a of the base part 10, and the main surface 13b is a surface facing the same side as the main surface 10b of the base part 10.

The joint portion 12 is provided between the base part 10 and the movable portion 13 and couples the base part 10 and the movable portion 13. The thickness of the joint portion 12 is formed to be thinner than the thickness of the base part 10 or the movable portion 13. The joint portion 12 has grooves 12a and 12b. The grooves 12a and 12b are formed along the X axis. In the joint portion 12, when the movable portion 13 is displaced with respect to the base part 10, the grooves 12a and 12b function as fulcrums, that is, intermediate hinges. Such a joint portion 12 and the movable portion 13 function as a cantilever.

In addition, the physical quantity detection element 40 is fixed to the surface from the main surface 10a of the base part 10 to the main surface 13a of the movable portion 13 by a bonding agent 60. The fixed positions of the physical quantity detection element 40 are two positions of the central position in the x axis direction of the main surface 10a and the main surface 13a.

The physical quantity detection element 40 includes a base portion 42a fixed to the main surface 10a of the base part 10 with the bonding agent 60, a base portion 42b fixed to the main surface 13a of the movable portion 13 with the bonding agent 60, and vibration beams 41a and 41b for detecting a physical quantity between the base portion 42a and the base portion 42b. In this case, the shapes of the vibration beams 41a and 41b are prismatic shapes, and when an AC voltage drive signal is applied to excitation electrodes (not illustrated) provided on the vibration beams 41a and 41b, bending vibration is performed along the x axis so as to be separated from or close to each other. That is, the physical quantity detection element 40 is a tuning fork type vibration piece.

On the base portion 42a of the physical quantity detection element 40, lead electrodes 44a and 44b are provided. These lead electrodes 44a and 44b are electrically coupled to excitation electrodes (not illustrated) provided on the vibration beams 41a and 41b. The lead electrodes 44a and 44b are electrically coupled to connection terminals 46a and 46b provided on the main surface 10a of the base part 10 by metal wires 48. The connection terminals 46a and 46b are electrically coupled to external connection terminals 49a and 49b by wiring (not illustrated). The external connection terminals 49a and 49b are provided on the main surface 10b side of the base part 10 as a surface on which the inertial sensor 200 is mounted on a package or the like so as to overlap a package bonding portion 34 in a plan view. The package bonding portion 34 is for mounting the substrate unit 5 of the inertial sensor 200 on an external member such as a package, and is provided at two locations on both ends of the base part 10 in the x axis direction.

The physical quantity detection element 40 is formed by patterning a crystal substrate cut out at a predetermined angle from a crystal gemstone or the like by a photolithography technique and an etching technique. In this case, the physical quantity detection element 40 may be made of the same material as the base part 10 and the movable portion 13 in consideration of reducing the difference between the linear expansion coefficient between the base part 10 and the movable portion 13.

The weights 50, 52, 54, and 56 are rectangular in a plan view, and are provided on the movable portion 13. The weights 50 and 52 are fixed to the main surface 13a of the movable portion 13 by a bonding member 62, and the weights 54 and 56 are fixed to the main surface 13b of the movable portion 13 by the bonding member 62. Here, in the weight 50 fixed to the main surface 13a, the directions of one side, which is a rectangular edge, and the side surface 13c of the movable portion 13 are aligned, and the directions of the other side and the side surface 31d of the extension portion 38a are aligned, in a plan view. The weight 50 is disposed on the side surface 13c side of the movable portion 13 by aligning the directions in this manner, and the weight 50 and the extension portion 38a are disposed so as to overlap each other in a plan view. Similarly, in the weight 52 fixed to the main surface 13a, the directions of one side, which is a rectangular edge, and the side surface 13d of the movable portion 13 are aligned, and the directions of the other side and the side surface 31e of the extension portion 38b are aligned, in a plan view. As a result, the weight 52 is disposed on the side surface 13d side of the movable portion 13, and the weight 52 and the extension portion 38b are disposed so as to overlap each other in a plan view. In the weight 54 fixed to the main surface 13b, the directions of one rectangular side and the side surface 13c of the movable portion 13 are aligned, and the directions of the other side and the side surface 31d of the extension portion 38a are aligned, in a plan view. As a result, the weight 54 is disposed on the side surface 13c side of the movable portion 13, and the weight 54 and the extension portion 38a are disposed so as to overlap each other in a plan view. Similarly, in the weight 56 fixed to the main surface 13b, the directions of one rectangular side and the side surface 13d of the movable portion 13 are aligned, and the directions of the other side and the side surface 31e of the extension portion 38b are aligned, in a plan view. As a result, the weight 56 is disposed on the side surface 13d side of the movable portion 13, and the weight 56 and the extension portion 38b are disposed so as to overlap each other in a plan view.

In the weights 50, 52, 54, and 56 disposed in this manner, the weights 50 and 52 are disposed symmetrically about the physical quantity detection element 40, and the weights 54 and 56 are disposed so as to overlap the weights 50 and 52, respectively, in a plan view. These weights 50, 52, 54, and 56 are fixed to the movable portion 13 by the bonding members 62 provided at the positions of the center of gravity of the weights 50, 52, 54, and 56, respectively. In addition, since the weights 50 and 54 and the extension portion 38a and the weights 52 and 56 and the extension portion 38b overlap each other in a plan view, when an excessive physical quantity is applied, the weights 50, 52, 54, and 56 abut on the extension portions 38a and 38b, and the displacement amounts of the weights 50, 52, 54, and 56 can be suppressed.

The bonding member 62 is formed of a silicone resin thermosetting adhesive or the like. It is applied to the main surface 13a and the main surface 13b of the movable portion 13 at two locations, respectively, and the weights 50, 52, 54, and 56 are mounted thereon, and thereafter the weights 50, 52, 54, and 56 are fixed to the movable portion 13 by being cured by heating. The bonding surfaces of the weights 50, 52, 54, and 56 facing the main surface 13a and the main surface 13b of the movable portion 13 are rough surfaces. As a result, when the weights 50, 52, 54, and 56 are fixed to the movable portion 13, the bonding area on the bonding surface is increased, and the bonding strength can be improved.

Figure 6:
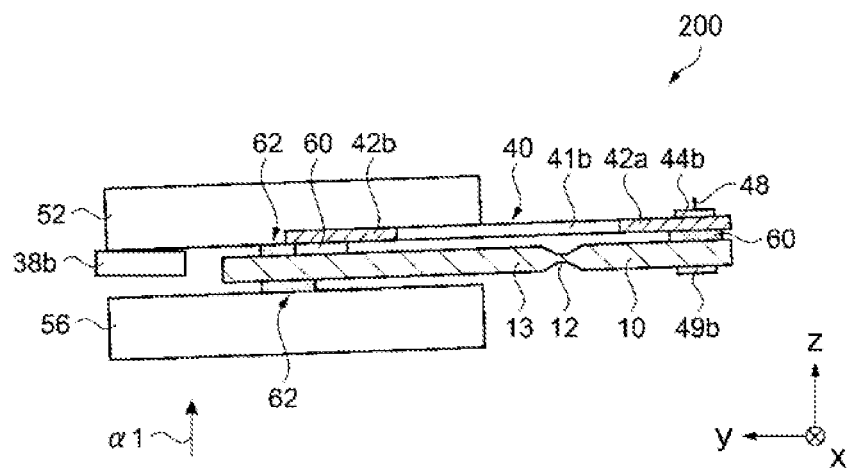
FIG. 6 is an explanatory diagram of an operation of the inertial sensor.

As illustrated in FIG. 6, when the acceleration in the +Z direction represented by the arrow α1 is applied to the inertial sensor 200 configured as described above, a force acts on the movable portion 13 in the −Z direction, and the movable portion 13 is displaced in the −Z direction with the joint portion 12 as a fulcrum. As a result, a force in a direction where the base portion 42a and the base portion 42b are separated from each other along the Y axis is applied to the physical quantity detection element 40, and tensile stress is generated in the vibration beams 41a and 41b. Therefore, the frequency at which the vibration beams 41a and 41b vibrate increases.

Figure 7:
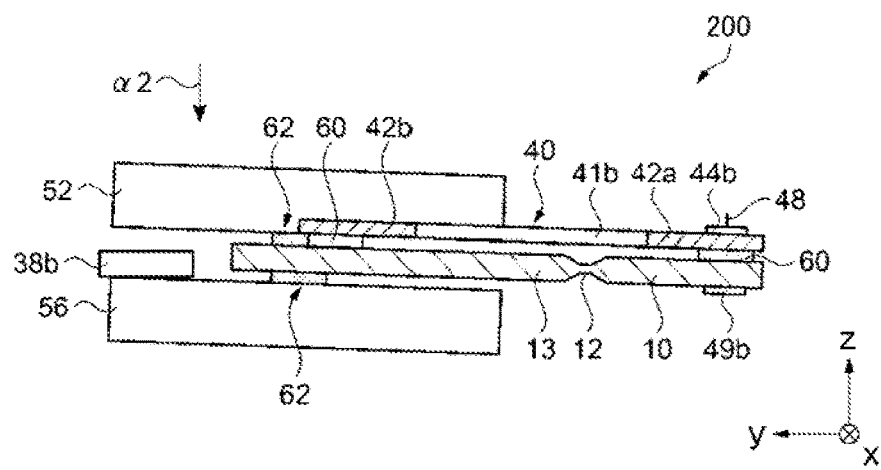
FIG. 7 is an explanatory diagram of the operation of the inertial sensor.

On the other hand, as illustrated in FIG. 7, when the acceleration in the −Z direction represented by the arrow α2 is applied to the inertial sensor 200, a force acts on the movable portion 13 in the +Z direction, and the movable portion 13 is displaced in the +Z direction with the joint portion 12 as a fulcrum. As a result, a force in a direction where the base portion 42a and the base portion 42b approach each other along the Y axis is applied to the physical quantity detection element 40, and compressive stress is generated in the vibration beams 41a and 41b. Therefore, the frequency at which the vibration beams 41a and 41b vibrate decreases.

When the frequency at which the vibration beams 41a and 41b vibrate changes according to the acceleration, the frequency of signals output from the external connection terminals 49a and 49b of the inertial sensor 200 changes. The sensor module 2 can calculate the value of the acceleration applied to the inertial sensor 200 based on the change in the frequency of the output signal of the inertial sensor 200.

In order to improve the detection accuracy of the acceleration which is a physical quantity, it is desirable that the joint portion 12 that couples the base part 10 and the movable portion 13 that is a stationary portion is a crystal that is a member having a high Q value. For example, the base part 10, the support portions 30a and 30b, and the movable portion 13 may be formed of a crystal plate, and groove portions 12a and 12b of the joint portion 12 may be formed by half etching from both surfaces of the crystal plate.

Figure 8:
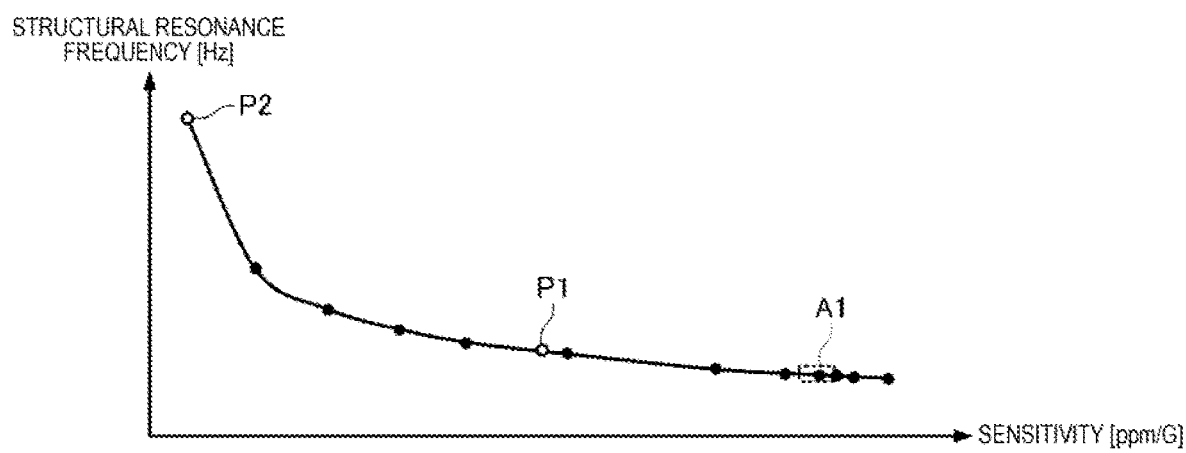
FIG. 8 is a graph illustrating an example of a relationship between sensitivity of the inertial sensor and a structural resonance frequency.

1-3. Relationship Between Inertia Sensor Sensitivity and Structural Resonance Frequency Next, a relationship between the sensitivity of the inertial sensor 200 and a structural resonance frequency in a detection axis direction will be described. The structural resonance frequency in the detection axis direction of the inertial sensor 200 is a natural frequency in the detection axis direction specified by the structure of the inertial sensor 200. Hereinafter, the "structural resonance frequency in the detection axis direction" is simply referred to as "structural resonance frequency". FIG. 8 is a graph illustrating an example of the relationship between the sensitivity and the structural resonance frequency when the inertial sensor 200 is an acceleration sensor, and is a graph plotting simulation results and measured values. In FIG. 8, a horizontal axis is sensitivity of the inertial sensor 200, and a vertical axis is the structural resonance frequency of the inertial sensor 200.

As illustrated in FIG. 8, the relationship between the sensitivity of the inertial sensor 200 and the structural resonance frequency is a curve. When the sensitivity is determined, the structural resonance frequency is uniquely determined. Conversely, when the structural resonance frequency does not change, it can be considered that the sensitivity does not change. For example, the structure of the inertial sensor 200 is designed so that the sensitivity and the structural resonance frequency are in a region A1 surrounded by a broken line. Therefore, in FIG. 8, when the sensitivity and the structural resonance frequency deviate from the region A1, it means that the state of the inertial sensor 200 is different from the state when the inertial sensor 200 is installed. For example, a point P1 in FIG. 8 corresponds to a case where half of the weights 50, 52, 54, and 56 are dropped, specifically, a case where the weights 50 and 52 are dropped or a case where the weights 54 and 56 are dropped. In addition, a point P2 in FIG. 8 corresponds to a case where all of the weights 50, 52, 54, and 56 are dropped.

Figure 9:
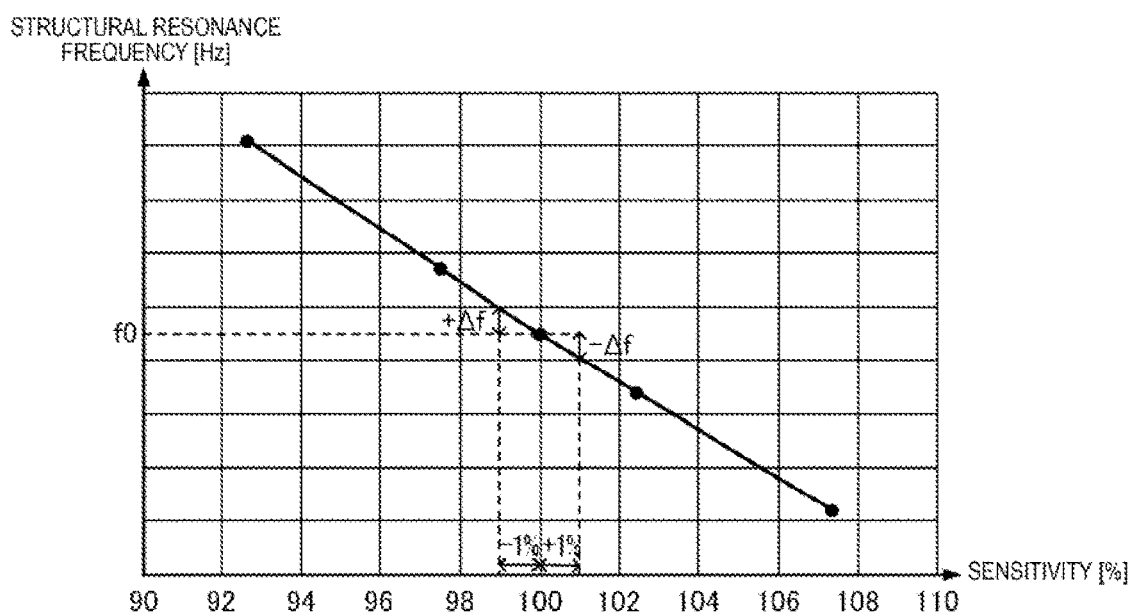
FIG. 9 is an enlarged graph of a region A1 in FIG. 8.

FIG. 9 is an enlarged graph of the region A1 in FIG. 8. However, in FIG. 9, a horizontal axis is converted into a sensitivity ratio where the sensitivity when the structural resonance frequency is f0 is 100%. In the range of the structural resonance frequency illustrated in FIG. 9, the relationship between the sensitivity of the inertial sensor 200 and the structural resonance frequency is substantially linear, and the amount of change in the structural resonance frequency is proportional to the amount of change in sensitivity. In FIG. 9, when the sensitivity decreases by 1%, the structural resonance frequency increases by $\Delta f$. Therefore, for example, if the allowable range of the sensitivity change amount is defined as within ±1% as the specification of the inertial sensor 200, the accuracy of the output signal of the inertial sensor 200 is not guaranteed when the structural resonance frequency changes beyond the range of $\pm \Delta f$. Therefore, the sensor module 2 of the present embodiment calculates the amount of change since the inspection of the structural resonance frequency of the inertial sensor 200 based on the output signal of the inertial sensor 200, and it may be determined that the inertial sensor 200 is abnormal, assuming that the amount of change in sensitivity exceeds an allowable range specified in the specification, when the amount of change in the structural resonance frequency exceeds the specified range.

For example, when the allowable range of the amount of change in sensitivity specified in the specification is within ±1%, the sensor module 2 may determines that the inertial sensor 200 is abnormal in a case in which the structural resonance frequency exceeds the range of $\pm \Delta f$. Accordingly, when half of the weights 50, 52, 54, and 56 corresponding to the point P1 in FIG. 8 are dropped, or when all the weights 50, 52, 54, and 56 corresponding to the point P2 in FIG. 8 are dropped, the sensor module 2 can determine that the inertial sensor 200 is abnormal.

1-4. Sensor System Configuration

Figure 10:
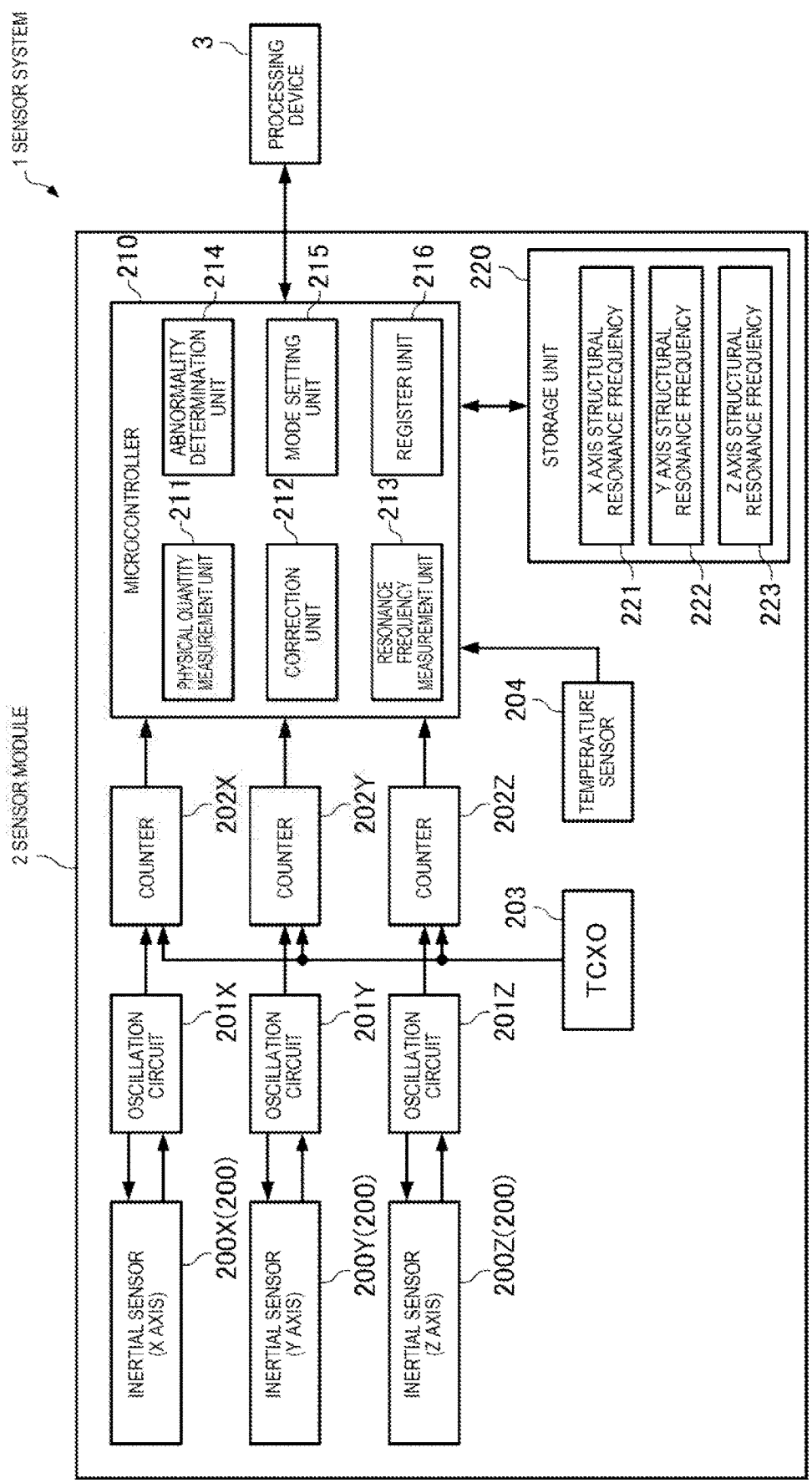
FIG. 10 is a diagram illustrating a configuration example of a sensor system according to a first embodiment.

Next, an example of the configuration of a sensor system 1 according to the present embodiment and an example of the functional configuration of the sensor module 2 will be described. FIG. 10 is a diagram illustrating a configuration example of the sensor system 1 of the present embodiment. As illustrated in FIG. 10, the sensor system 1 includes the sensor module 2 described above and a processing device 3 that performs processing based on the output signal of the sensor module 2. In FIG. 10, although there is one sensor module 2, the sensor system 1 may include a plurality of sensor modules 2, and the processing device 3 may perform processing based on output signals from the plurality of sensor modules 2. At least a portion of the plurality of sensor modules 2 may be installed in the same structure, or may be installed in different structures.

The sensor module 2 includes the above-described inertial sensors 200X, 200Y, and 200Z, oscillation circuits 201X, 201Y, and 201Z, counters 202X, 202Y, and 202Z, a temperature compensated crystal oscillator (TCXO) 203, the temperature sensor 204, the above-described microcontroller 210, and a storage unit 220.

The oscillation circuit 201X amplifies the output signal of the inertial sensor 200X to generate a drive signal, and applies the drive signal to the inertial sensor 200X. Due to the drive signal, the vibration beams 41a and 41b of the inertial sensor 200X vibrate at a frequency corresponding to the acceleration in the X axis direction, and a signal of the frequency is output from the inertial sensor 200X. In addition, the oscillation circuit 201X outputs a rectangular wave signal obtained by amplifying the output signal of the inertial sensor 200X to the counter 202X.

Similarly, the oscillation circuit 201Y amplifies the output signal of the inertial sensor 200Y to generate a drive signal, and applies the drive signal to the inertial sensor 200Y. Due to the drive signal, the vibration beams 41a and 41b of the inertial sensor 200Y vibrate at a frequency corresponding to the acceleration in the Y axis direction, and a signal of the frequency is output from the inertial sensor 200Y. In addition, the oscillation circuit 201Y outputs a rectangular wave signal obtained by amplifying the output signal of the inertial sensor 200Y to the counter 202Y.

Similarly, the oscillation circuit 201Z amplifies the output signal of the inertial sensor 200Z to generate a drive signal, and applies the drive signal to the inertial sensor 200Z. Due to the drive signal, the vibration beams 41a and 41b of the inertial sensor 200Z vibrate at a frequency corresponding to the acceleration in the Z axis direction, and a signal of the frequency is output from the inertial sensor 200Z. In addition, the oscillation circuit 201Z outputs a rectangular wave signal obtained by amplifying the output signal of the inertial sensor 200Z to the counter 202Z.

The counters 202X, 202Y, and 202Z operate using the oscillation signal output from the temperature compensated crystal oscillator 203 as a clock signal. The counter 202X counts a predetermined cycle of the rectangular wave signal output from the oscillation circuit 201X with a clock signal every predetermined cycle, and outputs X axis count data having a value obtained by the counting. Similarly, the counter 202Y counts a predetermined cycle of the rectangular wave signal output from the oscillation circuit 201Y with a clock signal, and outputs Y axis count data having a value obtained by the counting. Similarly, the counter 202Z counts a predetermined cycle of the rectangular wave signal output from the oscillation circuit 201Z with a clock signal, and outputs Z axis count data having a value obtained by the counting.

The storage unit 220 stores programs and data, and may include a volatile memory such as a static random access memory (SRAM) or a dynamic random access memory (DRAM). In addition, the storage unit 220 may also include a nonvolatile memory such as semiconductor memory such as an electrically erasable programmable read only memory (EEPROM) or a flash memory, a magnetic storage device such as a hard disk device, or an optical storage device such as an optical disk device. In the present embodiment, the storage unit 220 stores an X axis structural resonance frequency 221 that is a structural resonance frequency in the detection axis direction of the inertial sensor 200X at a first time point. In addition, the storage unit 220 also stores a Y axis structural resonance frequency 222 that is a structural resonance frequency in the detection axis direction of the inertial sensor 200Y at the first time point. In addition, the storage unit 220 stores a Z axis structural resonance frequency 223 that is a structural resonance frequency in the detection axis direction of the inertial sensor 200Z at the first time point. For example, the X axis structural resonance frequency 221, the Y axis structural resonance frequency 222, and the Z axis structural resonance frequency 223 are measured at the time of manufacturing or installing the sensor module 2, and are stored in a nonvolatile memory (not illustrated) included in the storage unit 220. That is, the first time point may be each time point when the X axis structural resonance frequency 221, the Y axis structural resonance frequency 222, and the Z axis structural resonance frequency 223 are measured at the time of manufacturing or installing the sensor module 2. The X axis structural resonance frequency 221, the Y axis structural resonance frequency 222, and the Z axis structural resonance frequency 223 are used for determining whether the inertial sensors 200X, 200Y, and 200Z are abnormal as reference values of the structural resonance frequency in each detection direction of the inertial sensors 200X, 200Y, and 200Z, respectively.

The microcontroller 210 performs various control processing and various arithmetic processing based on the count data output from the counters 202X, 202Y, and 202Z.

In the present embodiment, the microcontroller 210 includes a physical quantity measurement unit 211, a correction unit 212, a resonance frequency measurement unit 213, an abnormality determination unit 214, a mode setting unit 215, and a register unit 216. For example, the microcontroller 210 may function as each of the above units by executing a program (not illustrated) stored in the storage unit 220.

The physical quantity measurement unit 211 converts an X axis count data value, a Y axis count data value, and a Z axis count data value into a detection value of a physical quantity in the X axis direction, a detection value of a physical quantity in the Y axis direction, and a detection value of a physical quantity in the Z axis direction, respectively. For example, the storage unit 220 stores table information that defines the correspondence between the count data value and the detection value of the physical quantity, or information on the relational expression between the count data value and the detection value of the physical quantity, and the physical quantity measurement unit 211 may convert each count data into a detection value of the physical quantity by referring to the information. The physical quantity measurement unit 211 may perform filtering processing for reducing noise outside the frequency bandwidth of the physical quantity on the count data before converting into the detection value of the physical quantity, or thinning processing for reducing the data rate according to the frequency bandwidth of the physical quantity.

The correction unit 212 performs various correction calculations on the detection value of the physical quantity in the X axis direction, the detection value of the physical quantity in the Y axis direction, and the detection value of the physical quantity in the Z axis direction calculated by the physical quantity measurement unit 211. For example, the correction unit 212 may perform temperature correction for correcting a detection error due to temperature for each detection axis based on the output signal of the temperature sensor 204. In addition, the correction unit 212 also may perform sensitivity correction that corrects the detection sensitivity of the physical quantity for each detection axis, alignment correction that corrects a shift in detection sensitivity between the detection axes, and linearity correction that corrects the relationship between the physical quantity applied in each detection axis direction and the detection value of the physical quantity in each detection axis direction so as to approach a straight line. The correction unit 212 transmits the corrected detection value of the physical quantity in the X axis direction, the detection value of the physical quantity in the Y axis direction, and the detection value of the physical quantity in the Z axis direction to the processing device 3. Alternatively, the correction unit 212 may write the corrected detection value of the physical quantity in the X axis direction, the detection value of the physical quantity in the Y axis direction, and the detection value of the physical quantity in the Z axis direction to the predetermined data register of the register unit 216, respectively, and the processing device 3 may read the value of the register.

The resonance frequency measurement unit 213 measures the structural resonance frequency at a second time point in the detection axis direction of each of the inertial sensors 200X, 200Y, and 200Z based on the output signals of the inertial sensors 200X, 200Y, and 200Z. For example, the resonance frequency measurement unit 213 may measure the intensity of the output signals of the inertial sensors 200X, 200Y, and 200Z per frequency, and the first frequency having the maximum intensity may be set as the structural resonance frequency at the second time point. Since the band of the structural resonance frequency is different from the frequency bandwidth of the physical quantity, the resonance frequency measurement unit 213 does not perform the above-described filtering processing or thinning processing on the count data.

For the inertial sensor 200X, the abnormality determination unit 214 determines that the inertial sensor 200X is abnormal, when the X axis structural resonance frequency 221 stored in the storage unit 220, that is, the structural resonance frequency in the detection axis direction at the first time point and the structural resonance frequency in the detection axis direction at the second time point measured by the resonance frequency measurement unit 213 are separated from a predetermined value. Similarly, for the inertial sensor 200Y, the abnormality determination unit 214 determines that the inertial sensor 200Y is abnormal, when the Y axis structural resonance frequency 222 stored in the storage unit 220, that is, the structural resonance frequency in the detection axis direction at the first time point and the structural resonance frequency in the detection axis direction at the second time point measured by the resonance frequency measurement unit 213 are separated from a predetermined value. Similarly, for the inertial sensor 200Z, the abnormality determination unit 214 determines that the inertial sensor 200Z is abnormal, when the Z axis structural resonance frequency 223 stored in the storage unit 220, that is, the structural resonance frequency in the detection axis direction at the first time point and the structural resonance frequency in the detection axis direction at the second time point measured by the resonance frequency measurement unit 213 are separated from a predetermined value.

For example, the predetermined value may be set to a value smaller than the amount of change in the structural resonance frequency in the detection axis direction due to any one of the weights 50, 52, 54, and 56 dropping off. When the predetermined value is set in this manner, the abnormality determination unit 214 can determine that each of the inertial sensors 200X, 200Y, and 200Z is abnormal in a case in which at least one of the weights 50, 52, 54, and 56 is dropped. In addition, for example, when the difference between the structural resonance frequency in the detection axis direction at the first time point and the structural resonance frequency in the detection axis direction at the second time point is a predetermined value, the predetermined value may be set so that the amount of change in sensitivity is an upper limit or a lower limit of a range specified in the specification. When the predetermined value is set in this manner, the abnormality determination unit 214 can determine that there is an abnormality not only in a case in which at least one of the weights 50, 52, 54, and 56 is dropped, but also in a case in which the amount of change in sensitivity exceeds the range specified in the specification.

In addition, the abnormality determination unit 214 may determine that each of the inertial sensors 200X, 200Y, and 200Z is abnormal, when the ratio between the first frequency having the maximum intensity measured by the resonance frequency measurement unit 213 and the second frequency having the minimum intensity is smaller than a predetermined value.

The abnormality determination unit 214 transmits a determination result as to whether or not the inertial sensors 200X, 200Y, and 200Z are abnormal to the processing device 3. Alternatively, the abnormality determination unit 214 may write the determination result as to whether or not the inertial sensors 200X, 200Y, and 200Z are abnormal to predetermined data registers of the register unit 216, respectively, and the processing device 3 may read the value of the register.

The mode setting unit 215 sets the operation mode of the microcontroller 210 to any one of a plurality of operation modes including a physical quantity measurement mode and a resonance frequency measurement mode. For example, the mode setting unit 215 may set the operation mode to the physical quantity measurement mode, when a command for instructing measurement of each physical quantity in the X axis direction, the Y axis direction, and the Z axis direction is received from the processing device 3. For example, the mode setting unit 215 may set the operation mode to the resonance frequency measurement mode, when a command for instructing measurement of the structural resonance frequency of the inertial sensors 200X, 200Y, and 200Z is received from the processing device 3. Alternatively, the mode setting unit 215 may periodically set the operation mode to the physical quantity measurement mode and periodically set to the resonance frequency measurement mode.

The physical quantity measurement unit 211 and the correction unit 212 operate when the operation mode is set to the physical quantity measurement mode. In addition, the resonance frequency measurement unit 213 and the abnormality determination unit 214 operate when the operation mode is set to the resonance frequency measurement mode.

The register unit 216 includes various control registers and various data registers. For example, the register unit 216 may include a control register that sets an operation mode. In addition, for example, the register unit 216 may include a data register that stores the detection value of the physical quantity in the X axis direction, the detection value of the physical quantity in the Y axis direction, and the detection value of the physical quantity in the Z axis direction, or a data register that stores the value of the structural resonance frequency at the second time point of each of the inertial sensors 200X, 200Y, and 2002.

1-5. Abnormality Determination Method of Inertia Sensor

Figure 11:
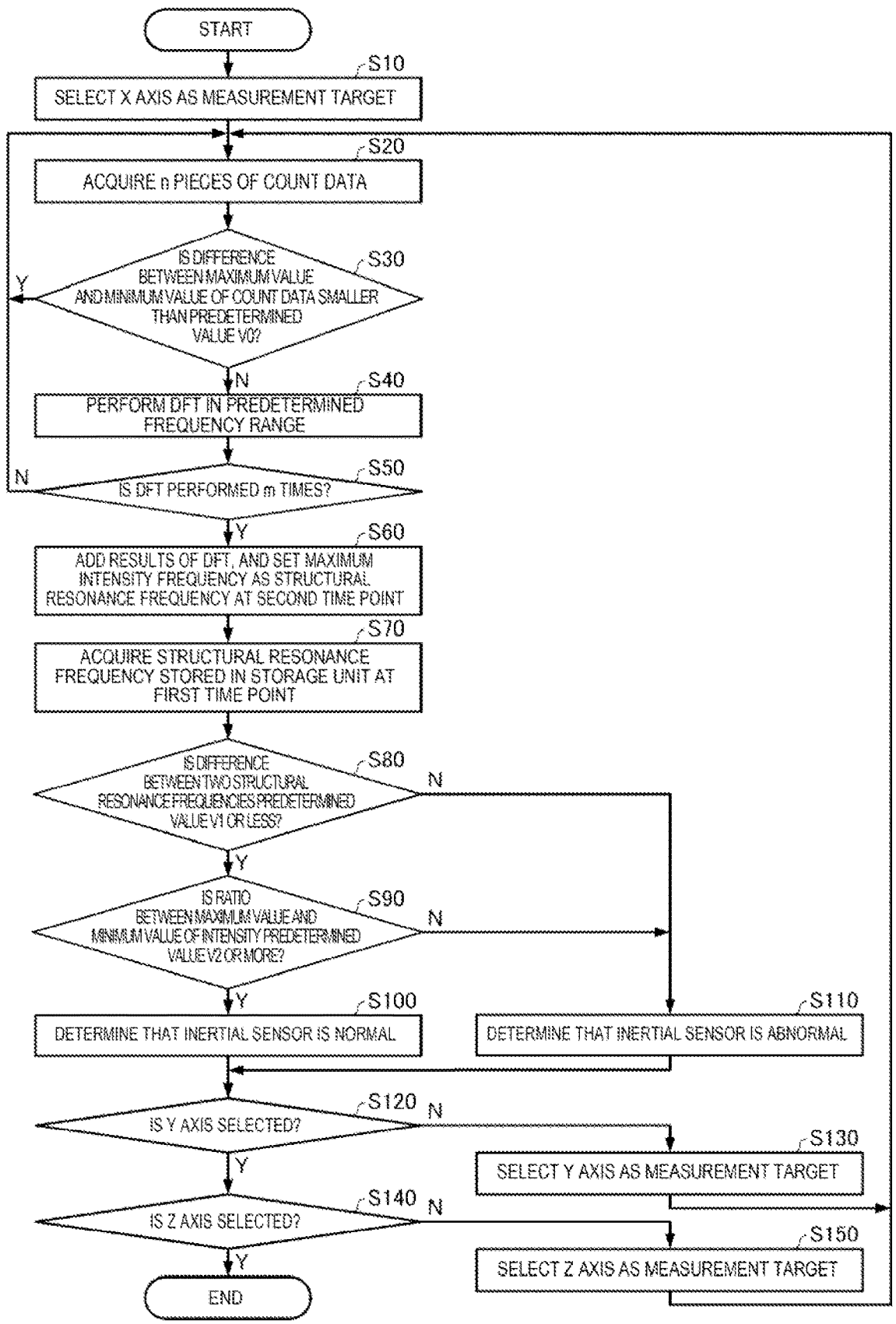
FIG. 11 is a flowchart illustrating an example of a procedure of an abnormality determination method according to the first embodiment.

Next, details of an abnormality determination method of the inertial sensor 200 of the present embodiment will be described. FIG. 11 is a flowchart illustrating an example of a procedure of the abnormality determination method for determining whether or not the inertial sensors 200X, 200Y, and 200Z are abnormal. Prior to the procedure of FIG. 11, the mode setting unit 215 sets the operation mode to the resonance frequency measurement mode. For example, the microcontroller 210 performs the abnormality determination processing illustrated in FIG. 11 by executing a program stored in the storage unit 220.

As illustrated in FIG. 11, first, the microcontroller 210 functions as the resonance frequency measurement unit 213, and selects the X axis, that is, the inertial sensor 200X as a measurement target of the structural resonance frequency (Step S10).

Next, the resonance frequency measurement unit 213 acquires n pieces of count data from the counter 202X (Step S20). The integer n may be 1,024, for example.

Next, the resonance frequency measurement unit 213 determines whether or not the difference between the maximum value and the minimum value of the n pieces of count data acquired in Step S20 is smaller than a predetermined value V0 (Step S30). When the difference between the maximum value and the minimum value of the n pieces of count data is smaller than the predetermined value (Y in Step S30), the resonance frequency measurement unit 213 newly acquires n pieces of count data (Step S20). For example, when the structure in which the sensor module 2 is installed hardly vibrates, since the amplitude of the structural resonance of the inertial sensors 200X, 200Y, and 200Z is significantly small, the structural resonance frequency may not be measured correctly. Therefore, the resonance frequency measurement unit 213 discards the n pieces of count data and newly acquires n pieces of count data, when the difference between the maximum value and the minimum value of the n pieces of count data is significantly small, that is, when the amplitude of the structural resonance is significantly small. Therefore, the predetermined value V0 is set to a value equal to or higher than the lower limit value at which the structural resonance frequencies of the inertial sensors 200X, 200Y, and 200Z can be measured correctly.

When the difference between the maximum value and the minimum value of the n pieces of count data is a predetermined value or more (N in Step S30), the resonance frequency measurement unit 213 performs discrete Fourier transform (DFT) on the n pieces of count data in a predetermined frequency range (step S40).

Figure 12:
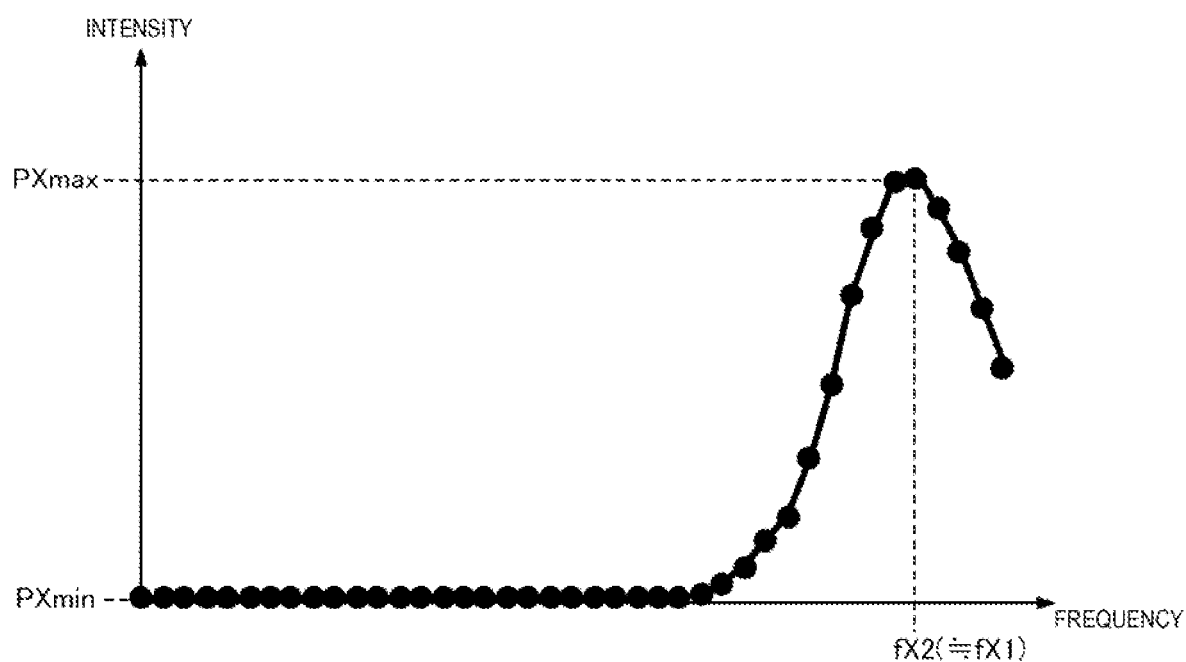
FIG. 12 is a graph illustrating an example of a result of discrete Fourier transform on count data obtained from an output signal of the inertial sensor that detects a physical quantity in an X axis direction.

The resonance frequency measurement unit 213 repeats the processing of Steps S20 to S40 until the discrete Fourier transform is performed m times (N in Step S50). When the discrete Fourier transform is performed m times (Y in Step S50), the resonance frequency measurement unit 213 adds the results of the discrete Fourier transform m times, and sets the maximum intensity frequency as the structural resonance frequency in the detection axis direction of the inertial sensor 200X at the second time point (Step S60). FIG. 12 is a graph illustrating an example of a graph obtained by performing discrete Fourier transform m times on n pieces of count data obtained from an output signal of the inertial sensor 200X and adding results m times. In FIG. 12, a horizontal axis represents frequency and a vertical axis represents intensity. In the example of FIG. 12, a frequency fX2 at which the intensity reaches the maximum value PXmax is the structural resonance frequency in the detection axis direction of the inertial sensor 200X at the second time point.

Next, the microcontroller 210 functions as the abnormality determination unit 214 and acquires the X axis structural resonance frequency 221 stored in the storage unit 220, that is, the structural resonance frequency in the detection axis direction of the inertial sensor 200X at the first time point (Step S70).

Next, the abnormality determination unit 214 determines that the inertial sensor 200X is normal (Step S100), when the difference between the structural resonance frequency in the detection axis direction of the inertial sensor 200X at the first time point acquired in step S70 and the structural resonance frequency in the detection axis direction of the inertial sensor 200X at the second time point measured in Steps S20 to S60 is a predetermined value V1 or less (Y in Step S80), and the ratio between the maximum value and the minimum value of the intensity is a predetermined value V2 or more (Y in Step S90).

In addition, the abnormality determination unit 214 determines that the inertial sensor 200X is abnormal (step S110), when the difference between the structural resonance frequency in the detection axis direction of the inertial sensor 200X at the first time point and the structural resonance frequency in the detection axis direction of the inertial sensor 200X at the second time point is larger than the predetermined value V1 (N in step S80), or when the ratio between the maximum value and the minimum value of the intensity is smaller than the predetermined value V2 (N in step S90).

For example, the predetermined value V1 is a value associated with the upper limit value of the allowable range of the sensitivity change amount specified in the specification. In addition, when the maximum value of the intensity is several tens of times the minimum value or more when the inertial sensors 200X, 200Y, and 200Z are normal, and the maximum value of the intensity is approximately several times the minimum value when the inertial sensors 200X, 200Y, and 200Z are abnormal, for example, the predetermined value V2 may be a value of approximately 10. In the example of FIG. 12, the structural resonance frequency fX2 at the second time point substantially matches a structural resonance frequency fX1 at the first time point, and the difference is the predetermined value V1 or less. In addition, since the maximum value PXmax of the intensity is several tens of times the minimum value PXmin or more, the ratio is the predetermined value V2 or more. Therefore, in a case of the example of FIG. 12, the abnormality determination unit 214 determines that the inertial sensor 200X is normal.

Figure 13:
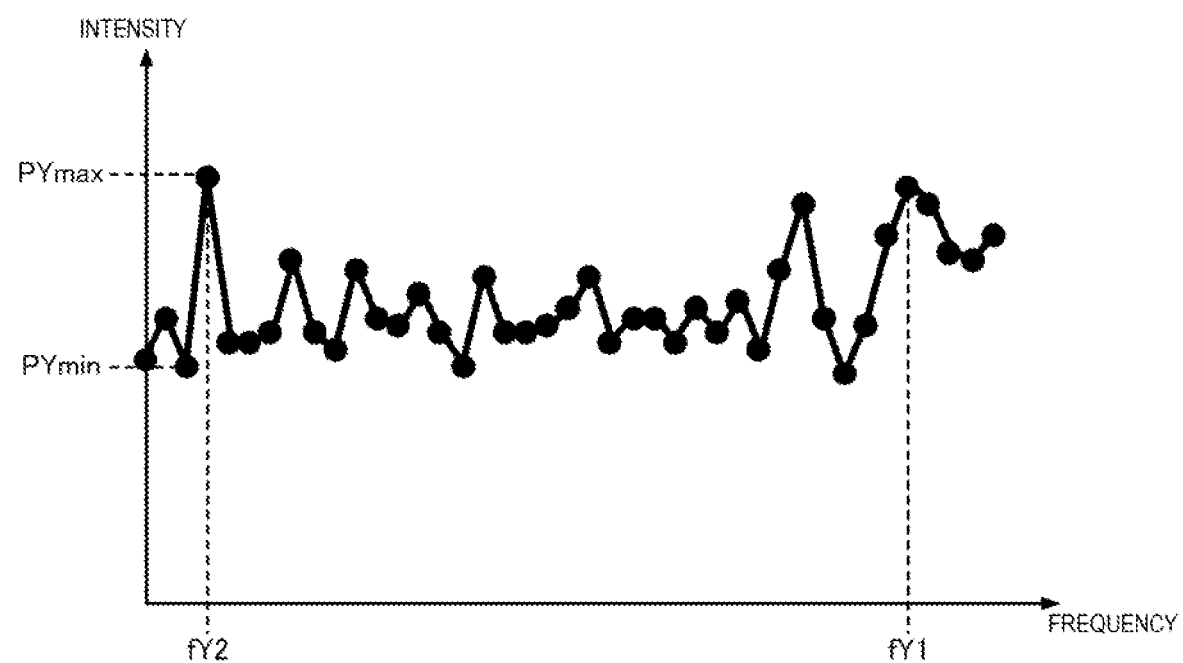
FIG. 13 is a graph illustrating an example of a result of discrete Fourier transform on count data obtained from an output signal of the inertial sensor that detects a physical quantity in a Y axis direction.

Next, the microcontroller 210 functions as the resonance frequency measurement unit 213, and selects the inertial sensor 200Y as the measurement target of the structural resonance frequency (Step S130) because the Y axis, that is, the inertial sensor 200Y is not selected as the measurement target of the structural resonance frequency (N in Step S120). When the processing of obtaining n pieces of count data from the counter 202Y and performing the discrete Fourier transform (processing of Steps S20 to S40) is repeated m times (Y in Step S50), the resonance frequency measurement unit 213 adds the results of the discrete Fourier transform m times, and sets the maximum intensity frequency as the structural resonance frequency in the detection axis direction of the inertial sensor 200Y at the second time point (Step S60). FIG. 13 is a graph illustrating an example of a graph obtained by performing discrete Fourier transform m times on n pieces of count data obtained from an output signal of the inertial sensor 200Y and adding results m times. In FIG. 13, a horizontal axis is frequency and a vertical axis is intensity. In the example of FIG. 13, a frequency fY2 at which the intensity reaches the maximum value PYmax is the structural resonance frequency in the detection axis direction of the inertial sensor 200Y at the second time point.

Next, the microcontroller 210 functions as the abnormality determination unit 214, and acquires the Y axis structural resonance frequency 222 stored in the storage unit 220, that is, the structural resonance frequency in the detection axis direction of the inertial sensor 200Y at the first time point (Step S70). The abnormality determination unit 214 determines that the inertial sensor 200Y is normal (Step S100), when the difference between the structural resonance frequency in the detection axis direction of the inertial sensor 200Y at the first time point acquired in Step S70 and the structural resonance frequency in the detection axis direction of the inertial sensor 200Y at the second time point measured in Steps S20 to S60 is a predetermined value V1 or less (Y in Step S80), and the ratio between the maximum value and the minimum value of the intensity is a predetermined value V2 or more (Y in Step S90).

In addition, the abnormality determination unit 214 determines that the inertial sensor 200Y is abnormal (Step S110), when the difference between the structural resonance frequency in the detection axis direction of the inertial sensor 200Y at the first time point and the structural resonance frequency in the detection axis direction of the inertial sensor 200Y at the second time point is larger than the predetermined value V1 (N in Step S80), or when the ratio between the maximum value and the minimum value of the intensity is smaller than the predetermined value V2 (N in Step S90).

In the example of FIG. 13, the structural resonance frequency fY2 at the second time point is smaller than a structural resonance frequency fY1 at the first time point, and the difference is larger than the predetermined value V1. In addition, since the maximum value PYmax of the intensity is approximately several times the minimum value PYmin, the ratio is smaller than the predetermined value V2. Therefore, in a case of the example of FIG. 13, the abnormality determination unit 214 determines that the inertial sensor 200Y is abnormal. In the example of FIG. 13, assuming that the intensity reaches a maximum value near the structural resonance frequency fY1 at the first time point, the difference between the structural resonance frequency fY1 at the first time point and the structural resonance frequency fY2 at the second time point is the predetermined value V1 or less. Even in that case, since the ratio between the maximum value and the minimum value of the intensity is smaller than the predetermined value V2, the abnormality determination unit 214 can determine that the inertial sensor 200Y is abnormal.

Figure 14:
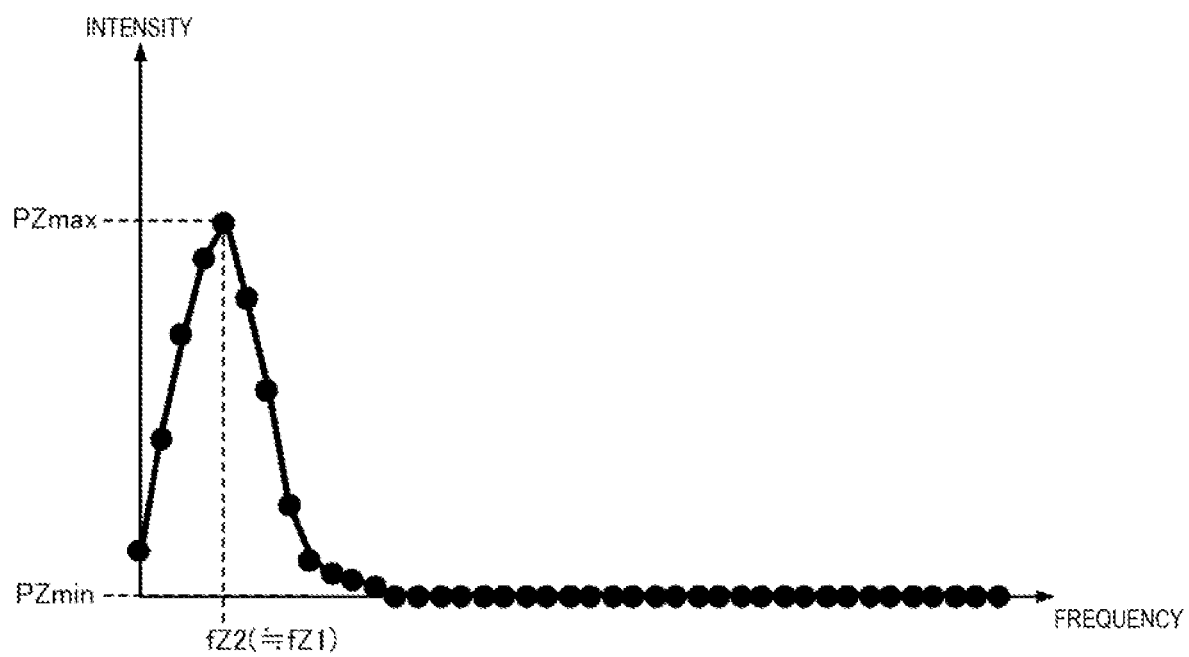
FIG. 14 is a graph illustrating an example of a result of discrete Fourier transform on count data obtained from an output signal of the inertial sensor that detects a physical quantity in a Z axis direction.

Next, the microcontroller 210 functions as the resonance frequency measurement unit 213, and selects the inertial sensor 200Z as the measurement target of the structural resonance frequency (Step S130) because the Z axis, that is, the inertial sensor 200Z is not selected as the measurement target of the structural resonance frequency (N in Step S140). When the processing of obtaining n pieces of count data from the counter 202Z and performing the discrete Fourier transform (processing of Steps S20 to S40) is repeated m times (Y in Step S50), the resonance frequency measurement unit 213 adds the results of the discrete Fourier transform m times, and sets the maximum intensity frequency as the structural resonance frequency in the detection axis direction of the inertial sensor 200Z at the second time point (Step S60). FIG. 14 is a graph illustrating an example of a graph obtained by performing discrete Fourier transform m times on n pieces of count data obtained from an output signal of the inertial sensor 200Z and adding results m times. In FIG. 14, a horizontal axis is frequency and a vertical axis is intensity. In the example of FIG. 14, a frequency fZ2 at which the intensity reaches the maximum value PZmax is the structural resonance frequency in the detection axis direction of the inertial sensor 200Z at the second time point.

Next, the microcontroller 210 functions as the abnormality determination unit 214, and acquires the Z axis structural resonance frequency 223 stored in the storage unit 220, that is, the structural resonance frequency in the detection axis direction of the inertial sensor 200Z at the first time point (Step S70). The abnormality determination unit 214 determines that the inertial sensor 200Z is normal (Step S100), when the difference between the structural resonance frequency in the detection axis direction of the inertial sensor 200Z at the first time point acquired in Step S70 and the structural resonance frequency in the detection axis direction of the inertial sensor 200Z at the second time point measured in Steps S20 to S60 is a predetermined value V1 or less (Y in Step S80), and the ratio between the maximum value and the minimum value of the intensity is a predetermined value V2 or more (Y in Step S90).

In addition, the abnormality determination unit 214 determines that the inertial sensor 200Z is abnormal (Step S110), when the difference between the structural resonance frequency in the detection axis direction of the inertial sensor 200Z at the first time point and the structural resonance frequency in the detection axis direction of the inertial sensor 200Z at the second time point is larger than the predetermined value V1 (N in Step S80), or when the ratio between the maximum value and the minimum value of the intensity is smaller than the predetermined value V2 (N in Step S90).

In the example of FIG. 14, the structural resonance frequency fZ2 at the second time point substantially matches the structural resonance frequency fZ1 at the first time point, and the difference is the predetermined value V1 or less. In addition, since the maximum value PZmax of the intensity is several tens of times the minimum value PZmin or more, the ratio is the predetermined value V2 or more. Therefore, in a case of the example of FIG. 14, the abnormality determination unit 214 determines that the inertial sensor 200Z is normal.

Step S70 in FIG. 11 is an example of a resonance frequency acquisition step. In addition, Steps S20, S30, S40, S50, and S60 in FIG. 11 are an example of a resonance frequency measurement step. In addition, Steps S80, S90, S100, and S110 in FIG. 11 are an example of an abnormality determination step.

1-6. Operational Effects

As described above, in the present embodiment, the resonance frequency measurement unit 213 measures the structural resonance frequency in the detection axis direction of the inertial sensor 200 at the second time point based on the output signal of the inertial sensor 200. Specifically, the resonance frequency measurement unit 213 measures the intensity per frequency of the output signal of the inertial sensor 200, and sets the first frequency having the maximum intensity as the structural resonance frequency at the second time point. The abnormality determination unit 214 determines that the inertial sensor 200 is abnormal, when the structural resonance frequency at the first time point stored in the storage unit 220 and the structural resonance frequency at the second time point are separated from a predetermined value. Therefore, according to the sensor system. 1, the sensor module 2, and the abnormality determination method of the sensor of the first embodiment, it is not necessary to generate a diagnostic control signal and supply it to the inertial sensor 200, and the size of the circuits reduced.

In addition, in the present embodiment, the abnormality determination unit 214 determines that the inertial sensor 200 is abnormal when the ratio between the first frequency having the maximum intensity measured by the resonance frequency measurement unit 213 and the second frequency having the minimum intensity is smaller than a predetermined value. Therefore, according to the sensor system 1, the sensor module 2, and the abnormality determination method of the sensor of the first embodiment, when the inertial sensor 200 is abnormal, even when the structural resonance frequency at the first time point and the structural resonance frequency at the second time point are not separated from the predetermined value, the possibility that the inertial sensor 200 is erroneously determined to be normal is reduced.

2. Second Embodiment

Hereinafter, in a sensor system according to a second embodiment, constituent elements similar to those in the first embodiment are denoted by the same reference numerals, the contents different from those in the first embodiment will be mainly described, and the description overlapping with that in the first embodiment will be omitted or simplified.

As illustrated in FIG. 10, the relationship between the sensitivity of the inertial sensor 200 and the structural resonance frequency is a curve. When the sensitivity is determined, the structural resonance frequency is uniquely determined. Therefore, when the structural resonance frequency changes, the sensitivity also changes. In the sensor system. 1 according to the second embodiment, the sensor module 2 adjusts the detection sensitivity of the physical quantity according to the structural resonance frequency at the second time point of the inertial sensors 200X, 200Y, and 200Z.

Figure 15:
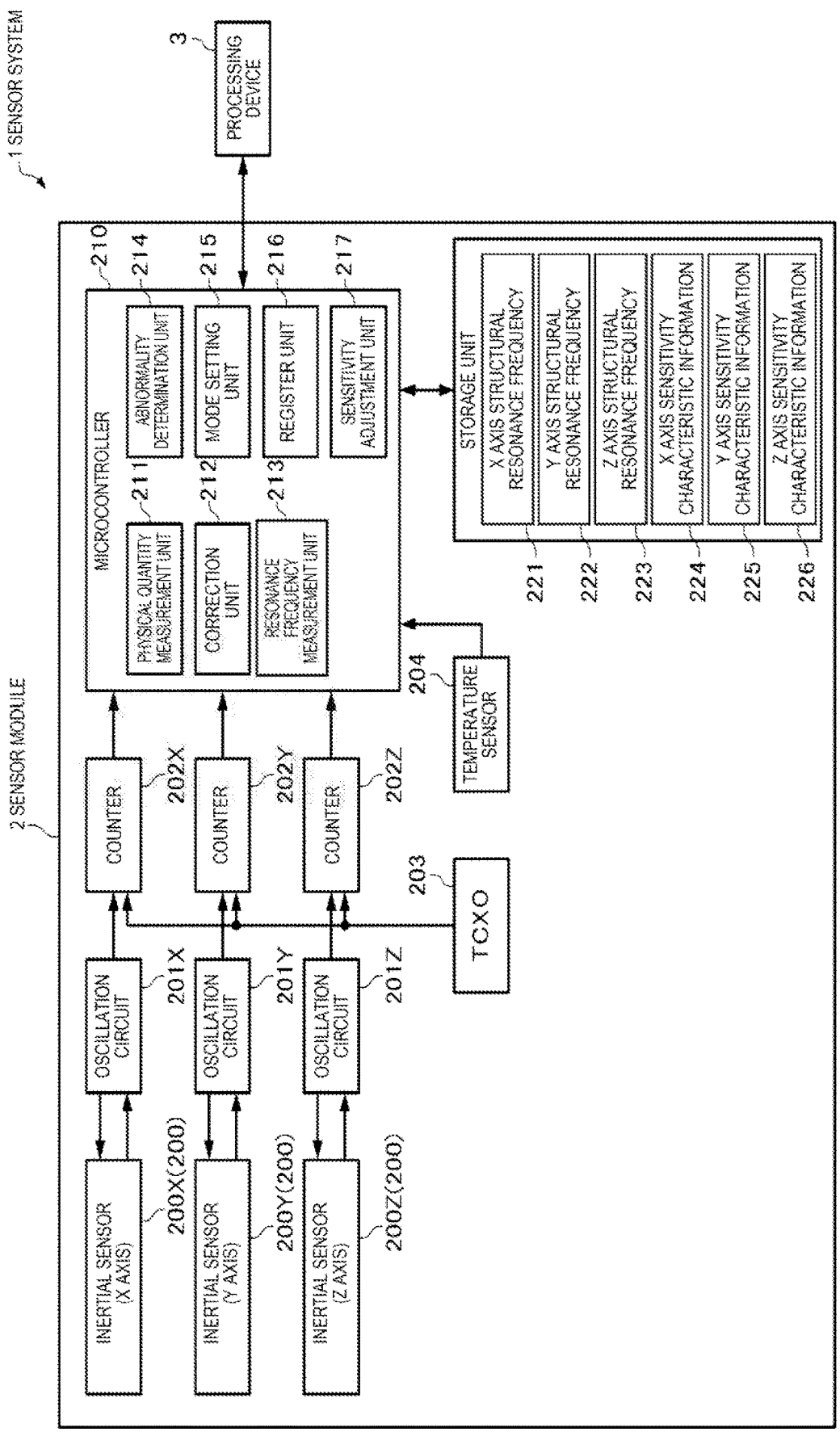
FIG. 15 is a diagram illustrating a configuration example of a sensor system according to a second embodiment.

FIG. 15 is a diagram illustrating a configuration example of the sensor system 1 according to the second embodiment. In FIG. 15, the same components as those in FIG. are denoted by the same reference numerals, and the description thereof will be omitted.

As illustrated in FIG. 15, in the second embodiment, the storage unit 220 stores X axis sensitivity characteristic information 224 that defines the relationship between the sensitivity of the inertial sensor 200X and the structural resonance frequency, Y axis sensitivity characteristic information 225 that defines the relationship between the sensitivity of the inertial sensor 200Y and the structural resonance frequency, and Z axis sensitivity characteristic information 226 that defines the relationship between the sensitivity of the inertial sensor 200Z and the structural resonance frequency, in addition to the X axis structural resonance frequency 221, the Y axis structural resonance frequency 222, and the Z axis structural resonance frequency 223. For example, the X axis sensitivity characteristic information 224, the Y axis sensitivity characteristic information 225, and the Z axis sensitivity characteristic information 226 may each be a correspondence table between sensitivity and structural resonance frequency, or a coefficient of relational expression between sensitivity and structural resonance frequency. It may be a numerical value. The X axis sensitivity characteristic information 224, the Y axis sensitivity characteristic information 225, and the Z axis sensitivity characteristic information 226 are acquired, for example, in an inspection process at the time of manufacturing and stored in the nonvolatile memory of the storage unit 220.

In addition, in the second embodiment, the microcontroller 210 includes the physical quantity measurement unit 211, the correction unit 212, the resonance frequency measurement unit 213, the abnormality determination unit 214, the mode setting unit 215, the register unit 216, and a sensitivity adjustment unit 217. For example, the microcontroller 210 may function as each of the above units by executing a program (not illustrated) stored in the storage unit 220. The functions of the physical quantity measurement unit 211, the correction unit 212, the resonance frequency measurement unit 213, the abnormality determination unit 214, the mode setting unit 215, and the register unit 216 are the same as those in the first embodiment, and thus description thereof will be omitted.

The sensitivity adjustment unit 217 adjusts the detection sensitivity of the physical quantity in the X axis direction according to the structural resonance frequency at the second time point in the detection axis direction of the inertial sensor 200X measured by the resonance frequency measurement unit 213. For example, the sensitivity adjustment unit 217 may calculate the amount of change in sensitivity according to the difference between the X axis structural resonance frequency 221 stored in the storage unit 220, that is, the structural resonance frequency at the second time point in the detection axis direction of the inertial sensor 200X, and the structural resonance frequency at the second time point in the detection axis direction of the inertial sensor 200X measured by the resonance frequency measurement unit 213 based on the X axis sensitivity characteristic information 224 stored in the storage unit 220, and may adjust the correction coefficient for sensitivity correction so that the amount of change in sensitivity is corrected by the sensitivity correction of the correction unit 212. Similarly, the sensitivity adjustment unit 217 adjusts the detection sensitivity of the physical quantity in the Y axis direction according to the structural resonance frequency at the second time point in the detection axis direction of the inertial sensor 200Y measured by the resonance frequency measurement unit 213. Similarly, the sensitivity adjustment unit 217 adjusts the detection sensitivity of the physical quantity in the Z axis direction according to the structural resonance frequency at the second time point in the detection axis direction of the inertial sensor 200Z measured by the resonance frequency measurement unit 213.

Figure 16:
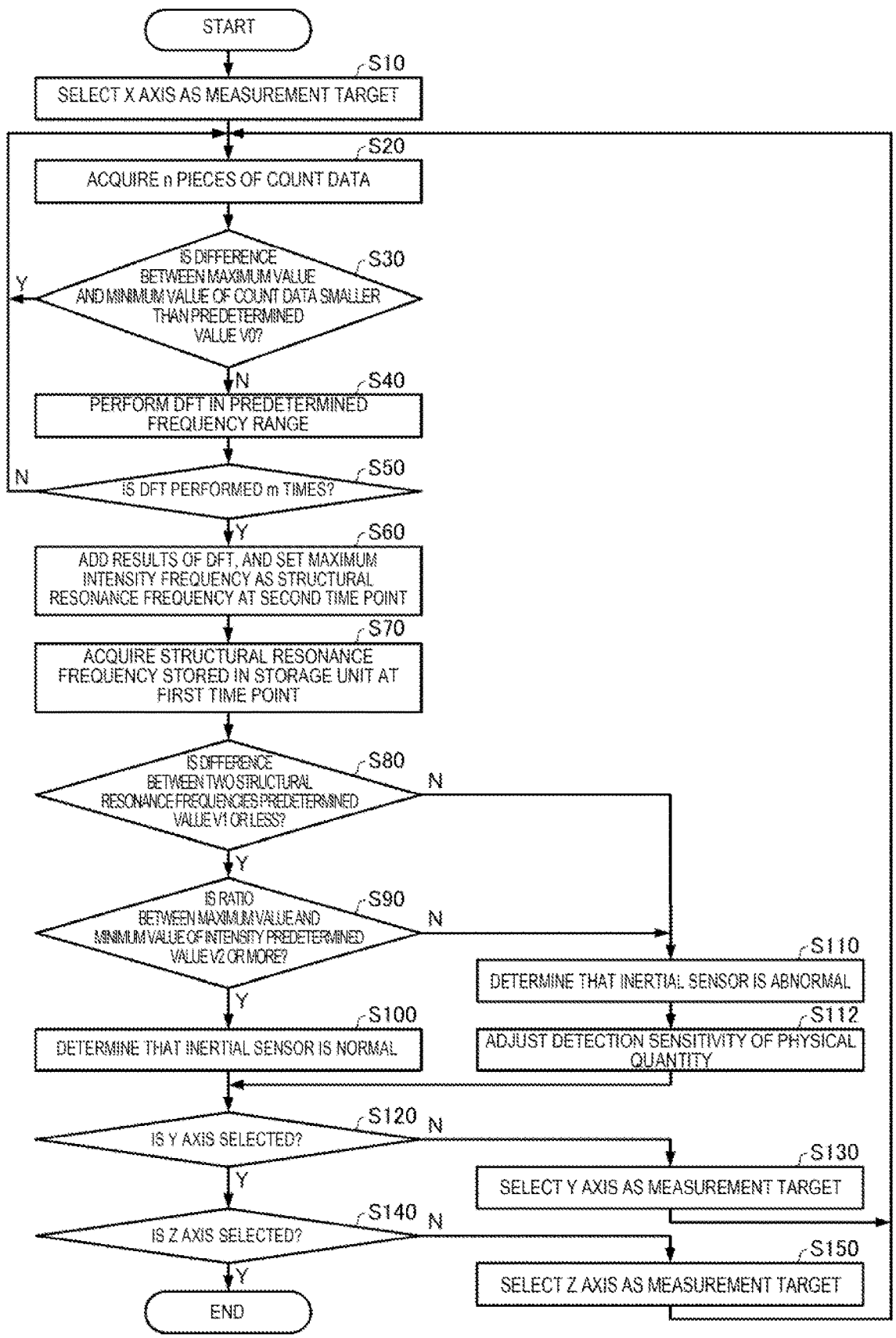
FIG. 16 is a flowchart illustrating an example of a procedure of an abnormality determination method according to the second embodiment.

FIG. 16 is a flowchart illustrating an example of a procedure of abnormality determination processing for determining whether or not the inertial sensors 200X, 200Y, and 200Z are abnormal by the microcontroller 210 according to the second embodiment. In FIG. 16, steps that perform the same processing as in FIG. 11 are given the same reference numerals, and detailed descriptions thereof will be omitted. Prior to the procedure of FIG. 16, the mode setting unit 215 sets the operation mode to the resonance frequency measurement mode. For example, the microcontroller 210 performs the abnormality determination processing illustrated in FIG. 16 by executing a program stored in the storage unit 220.

As illustrated in FIG. 16, first, the microcontroller 210 functions as the resonance frequency measurement unit 213, selects the X axis as the measurement target of the structural resonance frequency (Step S10), and performs the processing of Steps S20 to S60.

Next, the microcontroller 210 functions as the abnormality determination unit 214 and performs the processing of Steps S70 to S110. When it is determined that the inertial sensor 200X is abnormal (Step S110), the microcontroller 210 functions as the sensitivity adjustment unit 217 and adjusts the detection sensitivity of the physical quantity in the X axis direction (Step S112). For example, the sensitivity adjustment unit 217 may adjust the correction coefficient for the detection sensitivity of the physical quantity in the X axis direction by the correction unit 212.

Next, the microcontroller 210 functions as the resonance frequency measurement unit 213, selects the Y axis as the measurement target of the structural resonance frequency (Step S130), and performs the processing of Steps S20 to S60.

Next, the microcontroller 210 functions as the abnormality determination unit 214 and performs the processing of Steps S70 to S110. When it is determined that the inertial sensor 200Y is abnormal (Step S110), the microcontroller 210 functions as the sensitivity adjustment unit 217 and adjusts the detection sensitivity of the physical quantity in the Y axis direction (Step S112). For example, the sensitivity adjustment unit 217 may adjust the correction coefficient for the detection sensitivity of the physical quantity in the Y axis direction by the correction unit 212.

Next, the microcontroller 210 functions as the resonance frequency measurement unit 213, selects the Z axis as the measurement target of the structural resonance frequency (Step S150), and performs the processing of Steps S20 to S60.

Next, the microcontroller 210 functions as the abnormality determination unit 214 and performs the processing of Steps S70 to S110. When it is determined that the inertial sensor 200Z is abnormal (Step S110), the microcontroller 210 functions as the sensitivity adjustment unit 217 and adjusts the detection sensitivity of the physical quantity in the Z axis direction (Step S112). For example, the sensitivity adjustment unit 217 may adjust the correction coefficient for the detection sensitivity of the physical quantity in the Z axis direction by the correction unit 212.

In the flowchart of FIG. 16, although the sensitivity adjustment unit 217 adjusts the detection sensitivities of physical quantities in the X axis direction, the Y axis direction, and the Z axis direction, when the abnormality determination unit 214 determines that the inertial sensors 200X, 200Y, and 200Z are abnormal, the sensitivity adjustment unit 217 may adjust the detection sensitivity of the physical quantity regardless of the determination result of the abnormality determination unit 214 every time the resonance frequency measurement unit 213 measures the structural resonance frequency.

Step S70 in FIG. 16 is an example of a resonance frequency acquisition step. In addition, Steps S20, S30, S40, S50, and S60 in FIG. 16 are examples of a resonance frequency measurement step. In addition, Steps S80, S90, S100, and S110 in FIG. 16 are examples of an abnormality determination step. In addition, Step S112 in FIG. 16 is an example of a sensitivity adjustment step.

According to the sensor system 1, the sensor module 2, and the abnormality determination method of the inertial sensor of the second embodiment described above, the same effects as those of the first embodiment can be obtained. Furthermore, according to the sensor system 1, the sensor module 2, and the abnormality determination method of the inertial sensor of the second embodiment, since the sensitivity adjustment unit 217 adjusts the detection sensitivity of the physical quantity according to the structural resonance frequency at the second time point of the inertial sensor 200, the accuracy of the detection value of the physical quantity obtained by the subsequent processing of the physical quantity measurement unit 211 and the processing of the correction unit 212 can be improved.

3. Modification Example

The present disclosure is not limited to the present embodiment, and various modifications can be made within the scope of the gist of the present disclosure.

For example, in each of the embodiments described above, although the sensor module 2 includes three inertial sensors 200, the number of inertial sensors 200 included in the sensor module 2 may be one, two, four, or more.

In addition, in each of the embodiments described above, the sensor module 2 provided with an acceleration sensor as the inertial sensor 200 is taken as an example. The sensor module 2 may include an angular velocity sensor, an acceleration sensor and an angular velocity sensor, or an inertial measurement unit (IMU) as the inertial sensor 200.

In addition, in each of the embodiments described above, an element configured using a crystal as a physical quantity detection element included in the inertial sensor 200 is described as an example. The physical quantity detection element may be configured using a piezoelectric element other than the crystal, or may be a capacitance type micro electro mechanical systems (MEMS) element.

In addition, in each of the embodiments described above, the structural resonance frequency of the inertial sensors 200X, 200Y, and 200Z in each of the detection axis direction measured at the time of manufacturing or installing the sensor module 2 are stored in the storage unit 220 as the X axis structural resonance frequency 221, the Y axis structural resonance frequency 222, and the Z axis structural resonance frequency 223. Thereafter, the X axis structural resonance frequency 221, the Y axis structural resonance frequency 222, and the Z axis structural resonance frequency 223 are not updated, but may be updated. For example, each time the abnormality determination unit 214 performs a determination, the structural resonance frequency of the inertial sensors 200X, 200Y, and 200Z in each of the detection axis direction measured by the resonance frequency measurement unit 213 most recently may be stored in the storage unit 220 as the X axis structural resonance frequency 221, the Y axis structural resonance frequency 222, and the Z axis structural resonance frequency 223. In this case, the abnormality determination unit 214 determines that each of the inertial sensors 200X, 200Y, and 200Z is abnormal, when a time when the resonance frequency measurement unit 213 is previously measured is a first time point, a time when the resonance frequency measurement unit 213 is measured this time is a second time point, and the structural resonance frequency of the inertial sensors 200X, 200Y, and 200Z in each of the detection axis direction at the first time point and the structural resonance frequency of the inertial sensors 200X, 200Y, and 200Z in each of the detection axis direction at the second time point are separated from a predetermined value. Even in this manner, the abnormality determination unit 214 can determine that the inertial sensors 200X, 200Y, and 200Z are abnormal when at least one of the weights 50, 52, 54, and 56 is dropped.

In addition, in each of the embodiments described above, when the sampling frequency of the n pieces of count data by the resonance frequency measurement unit 213 is lower than twice the structural resonance frequency, the structural resonance frequency may be specified based on the frequency of a signal that is turned back to a frequency bandwidth equal to or lower than the Nyquist frequency that is ½ of the sampling frequency. For example, when the sampling frequency is 1 kHz when the structural resonance frequency is 800 Hz, the intensity of the 200 Hz signal that is turned back to a frequency bandwidth equal to or lower than the Nyquist frequency of 500 Hz is maximized. Therefore, the resonance frequency measurement unit 213 can specify 800 Hz obtained by subtracting 200 Hz from the sampling frequency of 1 kHz as the structural resonance frequency.

In addition, in each of the embodiments described above, the abnormality determination unit 214 determines whether or not each of the inertial sensors 200X, 200Y, and 200Z is abnormal, and may determine an abnormal mode, in addition to determining whether or not there is an abnormality. For example, when the structural resonance frequency at the second time point is lower than the structural resonance frequency at the first time point by 100 Hz or more, the abnormality determination unit 214 may determine an abnormal mode in which the joint portion 12 or the movable portion 13 is cracked. In addition, when the structural resonance frequency at the second time point is higher than the structural resonance frequency at the first time point in the range of 100 Hz to less than 300 Hz, the abnormality determination unit 214 may determine an abnormal mode in which a portion of the weights 50, 52, 54, and 56 is dropped. In addition, when the structural resonance frequency at the second time point is higher than the structural resonance frequency at the first time point by 300 Hz or more, the abnormality determination unit 214 may determine an abnormal mode in which all of the weights 50, 52, 54, and 56 is dropped.

In addition, in each of the embodiments described above, the sensor module 2 outputs the determination result by the abnormality determination unit 214 to the processing device 3, and may output information that is the basis of the determination result by the abnormality determination unit 214 to the processing device 3 together with the determination result by the abnormality determination unit 214 or instead of the determination result by the abnormality determination unit 214. For example, the resonance frequency measurement unit 213 may transmit the measured value of the structural resonance frequency at the second time point of the inertial sensors 200X, 200Y, and 200Z to the processing device 3. Alternatively, the resonance frequency measurement unit 213 writes the measured value of the structural resonance frequency at the second time point of the inertial sensors 200X, 200Y, and 200Z to each predetermined data register of the register unit 216, and the processing device 3 may read the value of the register. In addition, for example, the resonance frequency measurement unit 213 transmits information obtained by adding the result of discrete Fourier transform m times on each of the inertial sensors 200X, 200Y, and 200Z to the processing device 3, and the processing device 3 may specify the structural resonance frequency and determine the abnormal mode based on the information.

The above-described embodiments and modification examples are merely examples, and the present disclosure is not limited to these. For example, it is possible to appropriately combine each embodiment and each modification example.

The present disclosure includes configurations that are substantially the same as the configurations described in the embodiments (for example, configurations having the same functions, methods, and results, or configurations having the same objects and effects). In addition, the disclosure includes a configuration in which a non-essential part of the configuration described in the embodiment is replaced. In addition, the present disclosure includes a configuration that exhibits the same operational effects as the configuration described in the embodiment or a configuration that can achieve the same object. In addition, the disclosure includes a configuration in which a known technique is added to the configuration described in the embodiment.

What is claimed is:

1. A sensor module comprising:
an inertial sensor;
a storage unit that stores a structural resonance frequency in a detection axis direction of the inertial sensor at a first time point;
a resonance frequency measurement unit that measures the structural resonance frequency in the detection axis direction of the inertial sensor at a second time point based on an output signal of the inertial sensor; and
an abnormality determination unit that determines that the inertial sensor is abnormal when an amount of change in a sensitivity of the inertial sensor exceeds an allowable range for the inertial sensor and the structural resonance frequency at the first time point and the structural resonance frequency at the second time point are separated by a predetermined value or more.

2. The sensor module according to claim 1, wherein
the resonance frequency measurement unit measures an intensity of the output signal of the inertial sensor per frequency, and sets a first frequency having a maximum intensity as the structural resonance frequency at the second time point.

3. The sensor module according to claim 2, wherein
the abnormality determination unit determines that the inertial sensor is abnormal when a ratio between the first frequency and a second frequency having a minimum intensity is smaller than a predetermined value.

4. The sensor module according to claim 1, wherein
the inertial sensor includes a movable portion, a stationary portion, a joint portion coupling the movable portion and the stationary portion, and a physical quantity detection element bonded to the stationary portion and the movable portion, and the joint portion is a crystal.

5. The sensor module according to claim 1, further comprising:
a sensitivity adjustment unit that adjusts a detection sensitivity of a physical quantity according to the structural resonance frequency at the second time point.

6. A sensor system comprising:
the sensor module according to claim 1; and
a processing device that performs processing based on an output signal of the sensor module.

7. An abnormality determination method of an inertial sensor comprising:
a resonance frequency acquisition step of acquiring a structural resonance frequency in a detection axis direction of an inertial sensor at a first time point stored in a storage unit;
a resonance frequency measurement step of measuring the structural resonance frequency in the detection axis direction of the inertial sensor at a second time point based on an output signal of the inertial sensor; and
an abnormality determination step of determining that the inertial sensor is abnormal an amount of change in a sensitivity of the inertial sensor exceeds an allowable range for the inertial sensor and when the structural resonance frequency at the first time point and the structural resonance frequency at the second time point are separated by a predetermined value or more.

* * * * *